(12) United States Patent
Matos

(10) Patent No.: US 9,928,510 B2
(45) Date of Patent: Mar. 27, 2018

(54) TRANSACTION CHOICE SELECTION APPARATUS AND SYSTEM

(76) Inventor: Jeffrey A. Matos, New Rochelle, NY (US)

( * ) Notice: Subject to any disclaimer, the term of this patent is extended or adjusted under 35 U.S.C. 154(b) by 758 days.

(21) Appl. No.: 12/714,649

(22) Filed: Mar. 1, 2010

(65) Prior Publication Data

US 2010/0153190 A1 Jun. 17, 2010

Related U.S. Application Data

(63) Continuation-in-part of application No. 11/595,655, filed on Nov. 9, 2006, now abandoned, and a continuation-in-part of application No. 12/157,469, filed on Jun. 11, 2008, now Pat. No. 8,233,672.

(60) Provisional application No. 61/208,844, filed on Feb. 27, 2009.

(51) Int. Cl.
| | |
|---|---|
| *G06F 11/00* | (2006.01) |
| *G06Q 20/40* | (2012.01) |
| *G07C 13/00* | (2006.01) |

(52) U.S. Cl.
CPC ......... *G06Q 20/4014* (2013.01); *G07C 13/00* (2013.01)

(58) Field of Classification Search
USPC ....................................................... 705/12
See application file for complete search history.

(56) References Cited

U.S. PATENT DOCUMENTS

| | | | | |
|---|---|---|---|---|
| 5,870,723 | A * | 2/1999 | Pare, Jr. .................. | G06F 21/32 705/39 |
| 6,912,312 | B1 * | 6/2005 | Milner .................. | G06Q 20/341 340/5.83 |
| 2003/0136835 | A1 * | 7/2003 | Chung ............... | G06K 7/10346 235/386 |
| 2003/0149616 | A1 * | 8/2003 | Travaille .......................... | 705/12 |
| 2004/0024635 | A1 * | 2/2004 | McClure ................ | G07C 13/00 705/12 |

(Continued)

*Primary Examiner* — Zeshan Qayyum
(74) *Attorney, Agent, or Firm* — Karl F. Milde, Jr.; Eckert Seamans Cherin & Mellott, LLC

(57) ABSTRACT

An apparatus and system for casting votes electronically comprises both a host server and a plurality of voting machines at various remote locations. First "user identifying information" for a plurality of potential users who are registered to use the system is pre-stored in memory, either at the host server or at a voting machine, or both. Second "user identifying information" is entered by a user of the voting machine at the time the user wishes to vote. A display on the voting machine presents to the user voting information concerning at least one voting matter for which the user is to make a voting selection. A processor in either the host server or the voting machine, or both, compares the second user identifying information entered by the user of the voting machine with the first user identifying information, if any, previously stored in memory. The user of the voting machine is authorized to make a voting selection on the voting matter if the first and second user identifying information relating to this user are substantially similar. When a voting selection is made by an authorized user of the voting machine, the processor in the host server counts it as a vote. In this way, only users authorized to cast a vote are allowed to vote and the voting selections from all such authorized users who cast a vote are counted.

36 Claims, 22 Drawing Sheets

(56) References Cited

U.S. PATENT DOCUMENTS

2005/0049862 A1\* 3/2005 Choi ................... G10L 15/26
704/231
2007/0060798 A1\* 3/2007 Krupnik ............ A61B 1/00045
600/300

\* cited by examiner

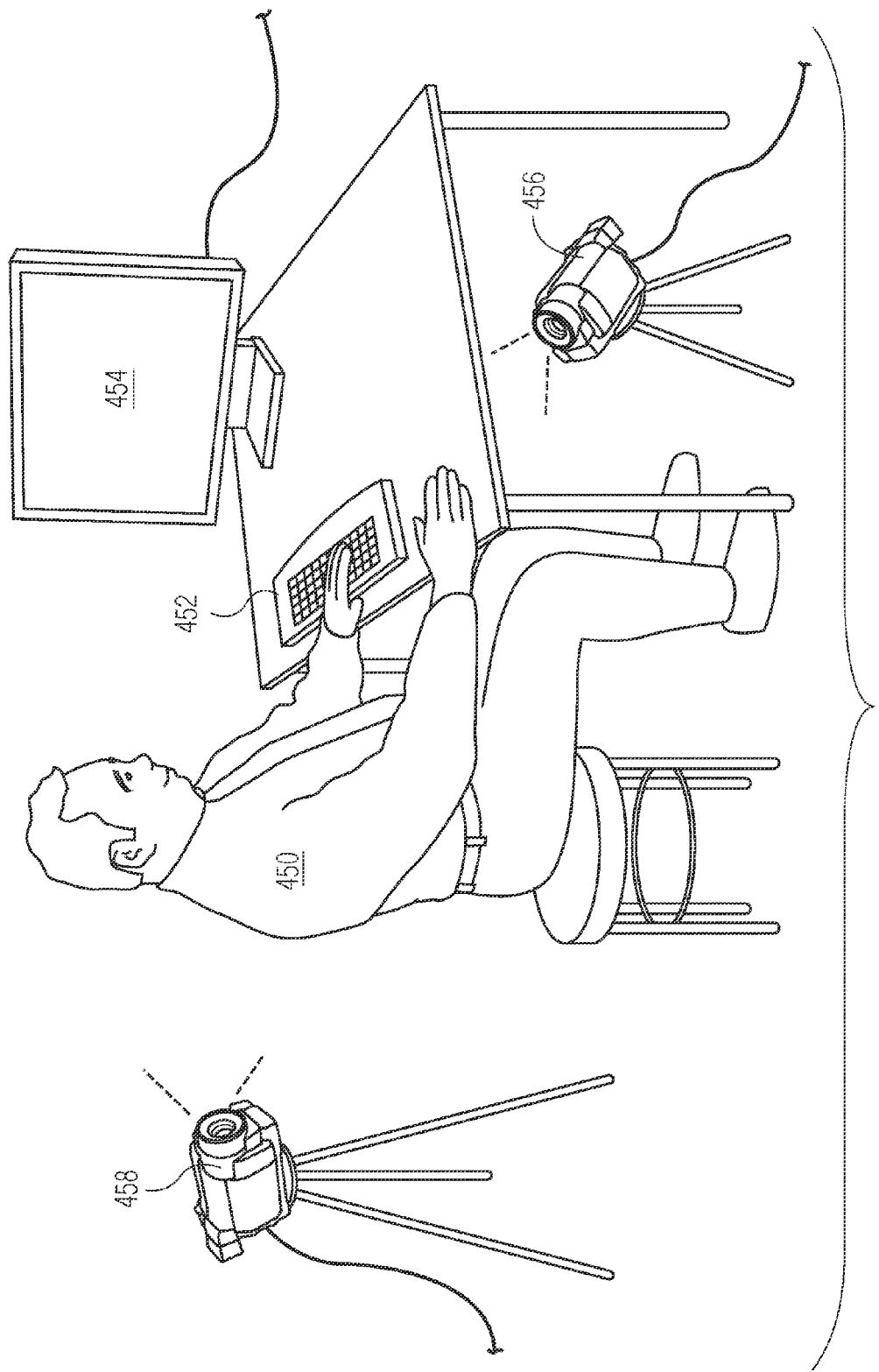

TRANSACTION CHOICE SELECTION APPARATUS AND SYSTEM

CROSS-REFERENCE TO RELATED APPLICATIONS

This application is a continuation-in-part of application Ser. No, 11/595,655 filed Nov. 9, 2006, and application Ser. No. 12/157,469 filed Jun. 11, 2008 (now U.S. Pat. No 8,233,672).

This application also claims priority from the Provisional Application No. 61/208,844 filed Feb. 27, 2009.

The subject matter of the aforementioned applications is incorporated herein by reference.

BACKGROUND OF THE INVENTION

Sophisticated handheld communication systems with ever-increasing computational power and communication versatility are becoming increasing prevalent in the population. Such devices have far greater capability than that of a simple telephone. Although communication and computational systems have been used to obtain samples of population opinions, the use of such devices to manage various government activities, which heretofore have been delegated to representatives, has not been accomplished.

U.S. application Ser. No. 11/595,695 presents methods of representative government in which some or all of the power of the elected representatives of the governed people is transferred [back] to the people who are allowed to vote directly on government matters. They may do so by taking a fractional vote away from their representatives, or in government formats in which the direct voters represent a third branch of the legislature, or a fourth branch of the government. Besides the Government of the United States of America, such methods are applicable to the governments of individual states, or smaller regions such as counties and municipalities. Such methods are also applicable to other countries, to alliances/groups of countries, to the United Nations, or to other government and non-government organizations with world-wide membership.

The disclosure herein describes apparatus for giving voters direct access to the management of a government.

SUMMARY OF THE INVENTION

The material herein includes apparatus and a system for effectuating the direct voting which is the subject of Ser. No. 11/595,655 "Government systems in which individuals vote directly and in which representatives are partially or completely replaced" including:

1) Apparatus and system which allows for voter registration for the aforementioned government systems;

2) Apparatus and system which allows for voter identification at the time a vote is cast, for the aforementioned government systems;

3) Apparatus and system which allows for troubleshooting in the event of an apparently failed voter identification, at the time of a vote;

4) Apparatus and system which allows a voter to vote electronically using virtually any communication system including a telephone (cellular or otherwise), a home computer, or even a pay telephone, as long as it is outfitted with/attached to suitable voter identification means; and 5) Apparatus and system which allows a user to
a) propose legislation;
b) nominate candidates; and
c) discuss an election or other legislative issue remotely.

Such apparatus and system are of potential use for the government of a country, a state, a county, a municipality, a village, etc. They are of potential use for the government of other entities including:

1) a corporation; and
2) the United Nations, or a similar body with international scope.

Hereinbelow, voting refers to a situation in which more than one person's view is taken into account, in an arithmetically predetermined manner, in making a decision. The decision may involve two or more options. The information given by the voter may:

A) be as simple as a single "yes" vs. "no";

B) involve a choice among two or more options in which a single most desirable option is selected by the voter;

C) involve a choice amount three or more options in which an hierarchical preference list is indicated by the voter (e.g. "X" is the first choice, "Z" is the second choice, and "Y" is the third choice);

D) involve the transmission, by a voter, of information which is more complex than a choice (e.g. a choice plus a statement which contains the reason for the choice); and E) involve multiple choices by a voter (e.g. voting on each of a number of different pieces of legislation).

The invention described herein also describes an apparatus and system for setting up a web site that allows for the execution of the aforementioned methods and formats. A registration process and user identification equipment assures the identity of users (including voters, administrators, individuals who provide information for voters and administrators, watchdogs/regulators, etc.) of the system. A person who wishes to vote signs onto the website and reads/reviews the legislative matter. If the potential voter wishes to obtain additional information (e.g. summary, commentary, voter debate, legislator debate, reference material, etc.), he may obtain this information via the website. Optionally, before voting, the voter may be tested to assure that he/she understands the matter on which he/she is voting. The voter then votes. The votes may be counted in a variety of ways including a simple total, or more complex counts based on State, Representative district or other criteria.

The voting information, with or without additional voter information, may be made available to legislators, the President and other executives and others in executive branches, various news media, and, possibly lobbyists and other private organizations.

In a preferred embodiment of the invention, the names of individual voters would not be disclosed. In an embodiment of the invention in which such names are disclosed, preferably the voting choices of these voters would not be disclosed.

Among the ways of generating a profit are a) by the lease or sale of information obtained during the voting process, or during the testing process, or during non-confidential chat sessions, b) by advertising, c) by sale of a company which maintains such a website, or by leasing the services of such a company or by any other contractual arrangement with such a company for the purpose of providing information about voter choices, d) by allowing lobbyists to use the website, and e) by allowing educational institutions to use the website.

The larger dividend of the apparatus and system described herein is that it provides apparatus and methods to allow the will and preferences of voters to be known in substantially real time, and it provides easy, secure access whereby large numbers of people may actively participate directly in their government.

When syntax or sentence structure calls for a pronoun hereinbelow, the male pronoun has been selected, for convenience and no other reason.

BRIEF DESCRIPTION OF THE DRAWINGS

FIG. 4F is a representational diagram of apparatus for imaging each of a witness, a biologic identifier of the witness, and a remote user of the voting system.

DETAILED DESCRIPTION OF THE PREFERRED EMBODIMENTS

Figure 1:
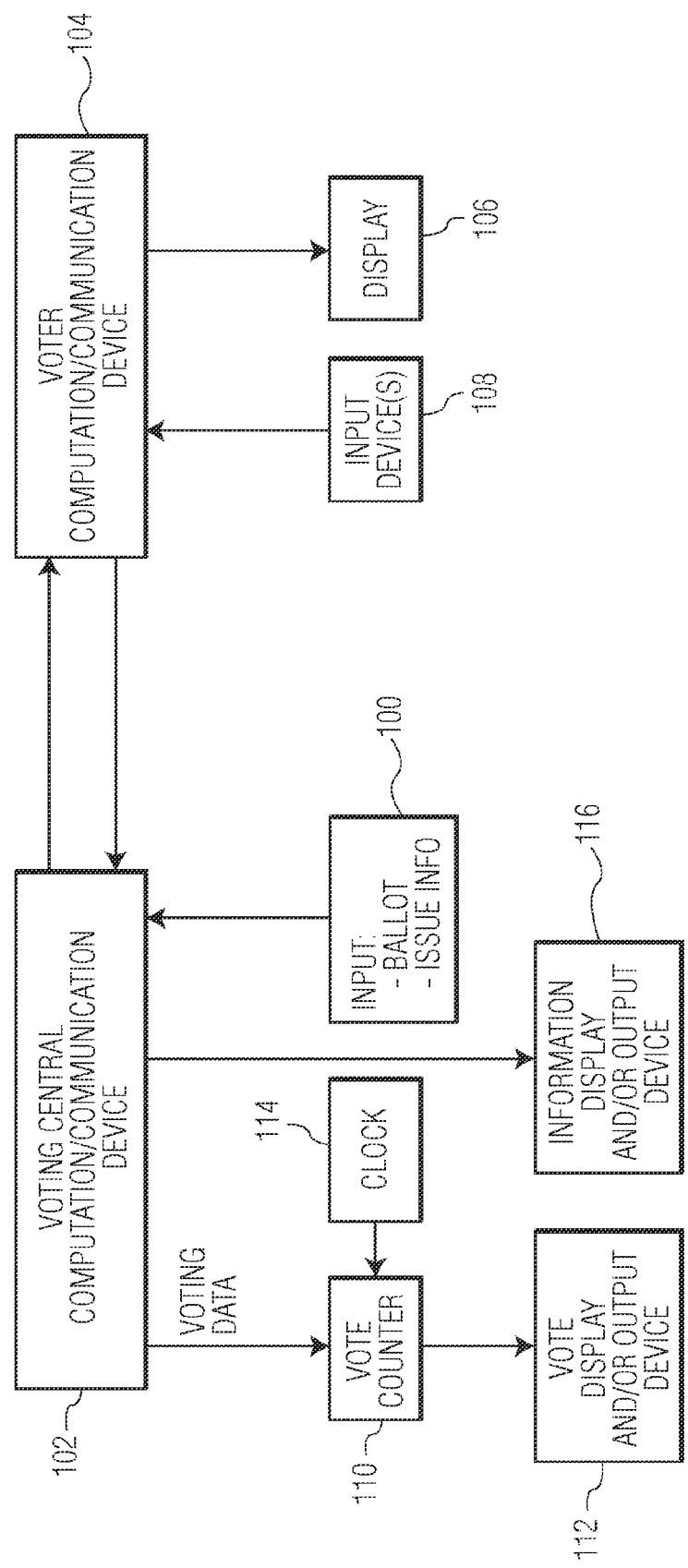
FIG. 1 is a block diagram of a voting system illustrating a voting machine, and a central computational/communication device for communicating with voting machines.

The preferred embodiments of the present invention will now be described with reference to FIGS. 1-19 of the drawings. Identical elements in the various figures are identified with the same reference numerals.

The Core System

FIG. 1 shows apparatus which lets a voter vote from a location which is remote from the location at which votes are counted, and which may be used in a government system with direct voters, as described in Ser. No. 11/595,655.

A ballot or other document which indicates the choices from which the voter makes his selection (hereinbelow each referred to as "ballot") is inputted at input device 100 to voting central computation/communication device ("VCCD") 102. VCCD 102 sends the ballot information to a plurality of voter computation/communication devices ("VCDs") 104, each of which displays the information at display device 106.

Examples of 102, 104 pairs include:

A) two devices capable of direct communication via radiofrequency;

B) devices which communicate over a public communications network, such as a telephone system, wherein 104 is a personal computation/communication device such as a telephone or other more sophisticated personal computation/communication device (e.g. a Blackberry®, as is known in the art);

C) 104 is a computer and 102 is another computer or a server, with 104 and 102 communicating over the internet; and D) devices which communication over a private communications network.

One or more links between 102 and 104 may be hardwired, may be infrared, optical, acoustic or microwave. 106 may include or be substituted with an output device such as a printer.

After reviewing the ballot, the voter may enter his choice or choices via input device(s) 108. Examples of 108 include:

A) a keyboard;

B) a touch sensitive screen (including devices which combine touch sensitive and fingerprint scanning technology, as discussed hereinbelow);

C) hardware which allows for the direct inputting of handwriting;

D) a speech recognition device; and

E) one or more switches which are dedicated to inputting a voter choice.

The voter choice is transmitted by the route 108 to 104 to 102, and after decoding and signal processing as is known in the art, is inputted to vote counter 110 and is optionally displayed and printed out by device 112. Clock 114 allows date and time stamping of the vote, and allows for the counting of only those votes which are submitted during the time interval allocated for voting.

The voter may submit information in addition to or instead of a vote, such as comments on an issue to be voted on, via 108 (either the same 108 device which inputs votes, or a different input device), which then traverses the route 108 to 104 to 102 to 116 where the information may be displayed and/or printed out. By doing this, the voter may have a dialog with one or more persons (e.g. with elected legislators, or with a representative who specifically represents direct voters [as discussed in Ser. No. 11/595,655])

A) at the voting central station; or

B) at a terminal linked to the voting central station. The VCCD to VCD arm of the dialog would be 100 to 102 to 104 to 106.

Embodiments of the invention are possible in which 104, 106 and 108 are a single device—such as a cellular telephone. Embodiments of the invention in which there is a single 104 (or 104/106/108) for each voter are possible, as are embodiments in which a single 104 (or 104/106/108) serves multiple voters.

Figure 2:
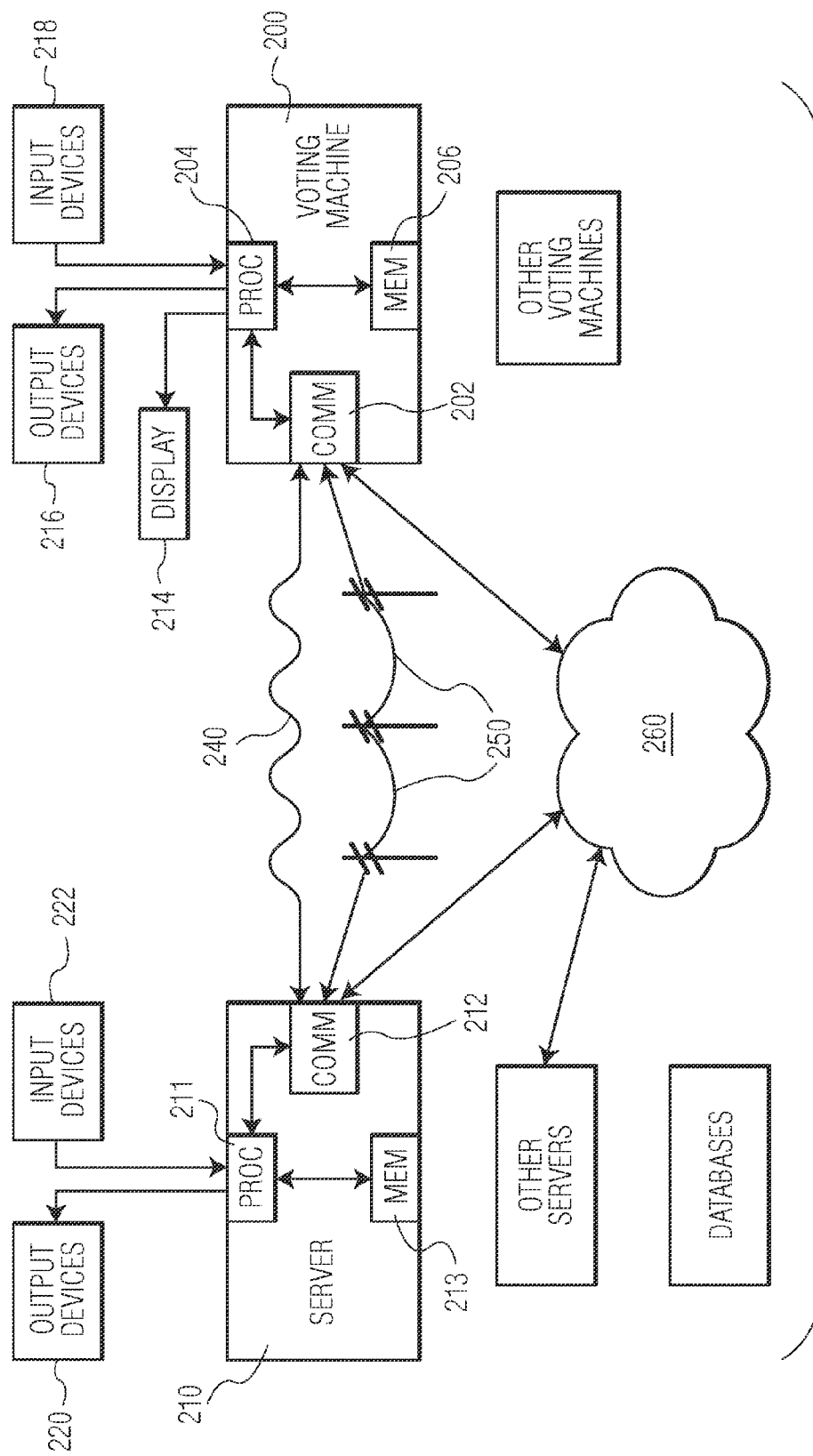
FIG. 2 is a detailed block diagram of a voting system.

A more detailed diagram of a preferred embodiment of the invention is shown in FIG. 2

FIG. 2 shows another schematic view of a voting system. Server 210 communicates with a plurality of voting machines (one of which is shown in the FIG. 200. Each voting machine has a processor 204, a memory 206 and a communication device 202 for communicating with a communication device 212 in the server. Communication may be via the internet 230, by a wireless network 240 (which may be, for example, a public telephone system, a private telephone system, a radiofrequency link, etc.), or by a hardwired connection 250 (either public or private).

The voting machine is outfitted with output devices including a display device 214 for displaying voting choices (e.g. names of candidates, matters to be voted on, entire pieces of legislation, background materials, debate/discussion related matters, etc.). Other miscellaneous output devices 216 include a loudspeaker and a printer.

Voting machine input devices 218 include a keyboard for inputting a voting choice, or for inputting (a) proposed legislation, (b) discussion and debate, (c) voter identifying information, (d) text identifying information for other users of the voting machine (e.g. registration person, a witness, etc), and (e) the answers to one or more questions that test the voter's understanding of the matter to be voted upon. An advantage of such a test, is that it may avoid legislators and their constituents voting on excessively lengthy matters that they have not read. Another advantage is that it makes the act of voting harder to hack.

Other voting machine input devices include:
(i) one or more cameras for imaging a voter, a registration person, and/or a witness;
(ii) a microphone for voice input, for recording a voiced vote, for recording a voiceprint, for recording an affirmation by a witness or a registration person, etc.;
(iii) a device which may process a human tissue sample, for the identification of the DNA or RNA of a person using the machine;
(iv) the display device, which may be touch sensitive; and
(v) one or more switches, which may indicate yes/no responses (or which may have more than two switch configurations) for a voter, a registration person or a witness.

The server processor 211 is coupled to each of:
(i) the server memory 213,
(ii) the server communication device 212,
(iii) input devices, collectively 222, and
(iv) output devices, collectively 220.

The server has a variety of possible output devices 220 including a video monitor, a printer, and a loudspeaker. Input devices 222 for the server including a keyboard, one or more cameras, a microphone, a touch sensitive screen, switches and a tissue sample processor, for identifying users of the server, at the server location.

The server may access other servers through the internet (shown in the figure) or through one of the other communication modalities. Such other servers may include databases which contain identifying information for users of the system; informational websites for providing information concerning matters to be voted on; discussion sites, allowing voters, voters' representatives and others to discuss a matter to be voted on, and archival sites to preserve digital evidence of the legitimacy of a vote, an election, etc.

The printer at either site may produce a confirmation that a vote was properly entered and counted, or in the case of a non-counted vote, may produce an output indicating the non-counted event, and the reason for the non-count. Alternatively, a digital confirmation may be produced, i.e. as an email, a text message, a message on a secure website, etc.

Voter Eligibility, Registration and Identification

A system is necessary which allows identification of a person desiring to vote to ensure that
A) only eligible voters cast a vote, and
B) no eligible voter votes more than once.
(It is not Necessary that all Eligible Voters Vote.)

Eligibility to vote on legislative issues may depend on a variety of criteria including, for example, age and permanent address. In the case of a voting system which involves stock ownership, eligibility may depend on the class of shares owned (and it may be necessary to verify the number of shares owned). Eligibility may be established either:
A) at the time voting is to take place, or
B) in advance of a vote.
The latter is especially desirable if voting is to be a recurring process.

Registration is the process of matching the name of an eligible potential voter, with an identifying feature ("identifier") of that voter, such that the identifier may be used at the time of a vote to determine that the person who desires to vote is indeed the same eligible voter that he claims to be. Examples of a registration process would be:
A) filing a picture known to be that of the registrant, at the time of registration. Examples of such a picture are those from a driver's license or passport;
B) filing a signature known to be that of the registrant, at the time of registration. Examples of a signature are those from either of a driver's license or passport, a notarized signature, or a digital signature;
C) filing a fingerprint;
D) filing a DNA sample;
E) filing another biological marker such as a voiceprint, a retinal pattern, an iris pattern, etc.; and
F) combinations of A)-E).

Identifiers may be stored:

A) at a location remote from the voter's location;
B) at the voter's location; or
C) at both the voter's location and at a remote location.

At the time of a vote, the person desiring to vote proves that he is the person that he claims to be by being able to generate an identical or nearly identical copy of the identifier. If he can do so, his vote is counted; if he can not, the vote is not counted. This process is shown diagrammatically and is discussed hereinbelow.

Figure 3:
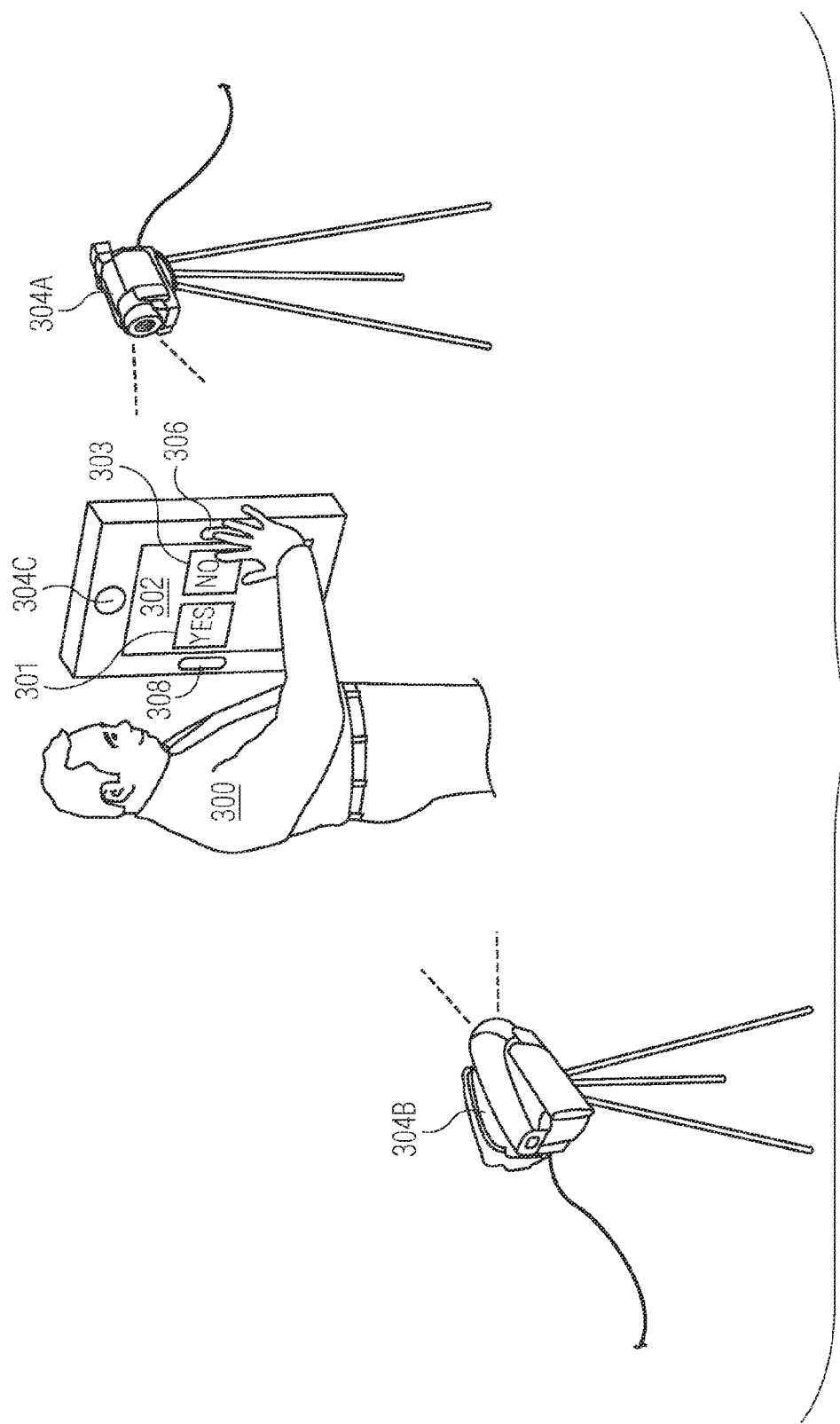
FIG. 3 is a representational diagram of apparatus for determining a user choice and a biologic identifier of the user.

FIG. 3 shows an example of apparatus which may be used in:

A) the registration process;
B) the voting process; or
C) both A) and B).

In the registration process, person 300 who can provide proof of his name, places one or more fingers on 302 (at which time the boxes containing the words "yes" and "no" are absent) which scans the fingerprint pattern. When scanning is complete, the fingerprint pattern and the person's name are entered into a database; the entry indicates the association of the fingerprint pattern and the name. Alternative embodiments include embodiments in which:

A) other alphanumeric data relating to the registrant are also entered into the database, such as one or more of:
  1) the home address;
  2) the social security number;
  3) one or more telephone numbers; and
  4) one or more email addresses; and/or
B) other biologic data (either in addition to the aforementioned fingerprint or instead of them) is identified and entered into the database. Visually identifiable biologic data include:
  1) fingerprints of other fingers;
  2) palm prints;
  3) a detailed view of the person's face; In the figure, video camera 304C is used for such recording;
  4) a voiceprint; and
  5) iris and/or retinal patterns.

Various methods of entering fingerprint patterns into the database may be employed, and will be obvious to those skilled in the art.

When the apparatus in FIG. 3 is used in the voting process, screen 302 may have touch sensitive features, with the capability of recording a voter choice based on the position of the voter's finger on the surface of the screen. The image recorded by camera 304C confirms that the voter is the person that he claims to be, i.e. that the person who is voting is the person who is then supplying the fingerprint. Fingerprint scanning may take place directly through the touch sensitive screen, or may involve a finger immediately adjacent to the screen. For example, in the case of a "no" vote, the right index finger may be used to touch box 303 marked "no" and the right middle finger may be used to touch fingerprint scanning screen 306; and in the case of a "yes" vote, the left index finger may be used to touch box 3031 marked "yes" and the left middle finger may be used to touch fingerprint scanning screen 308.

An additional video camera 304B may be placed behind and somewhat to the side of (or above) person 300, in order to simultaneously visualize the person and the screen. The purpose of the second camera would be to provide additional security for either the registration or the voting process. Yet another camera, 304A, may serve to input an image including (a) the voter's face and his finger touching the box corresponding to his voting choice in a single image, (b) the voter's fingerprint and his finger touching the box corresponding to his voting choice in a single image, (c) the voter's face, fingerprint and finger indicating the voting choice, and (d) either (a) or (c) along with a view of the voter's torso (all in a single image), in order to show that the hand and face belong to the same individual. Embodiments with even larger numbers of cameras are possible.

Alternate embodiments of the invention involve apparatus which is analogous to that shown in FIG. 2 but with an alternate biologic marker other than fingerprints. One example would be a DNA sample. The presence of video cameras would assure that, at the time of voting, the person giving the sample is the same as the person who is the source of information.

Figure 4A:
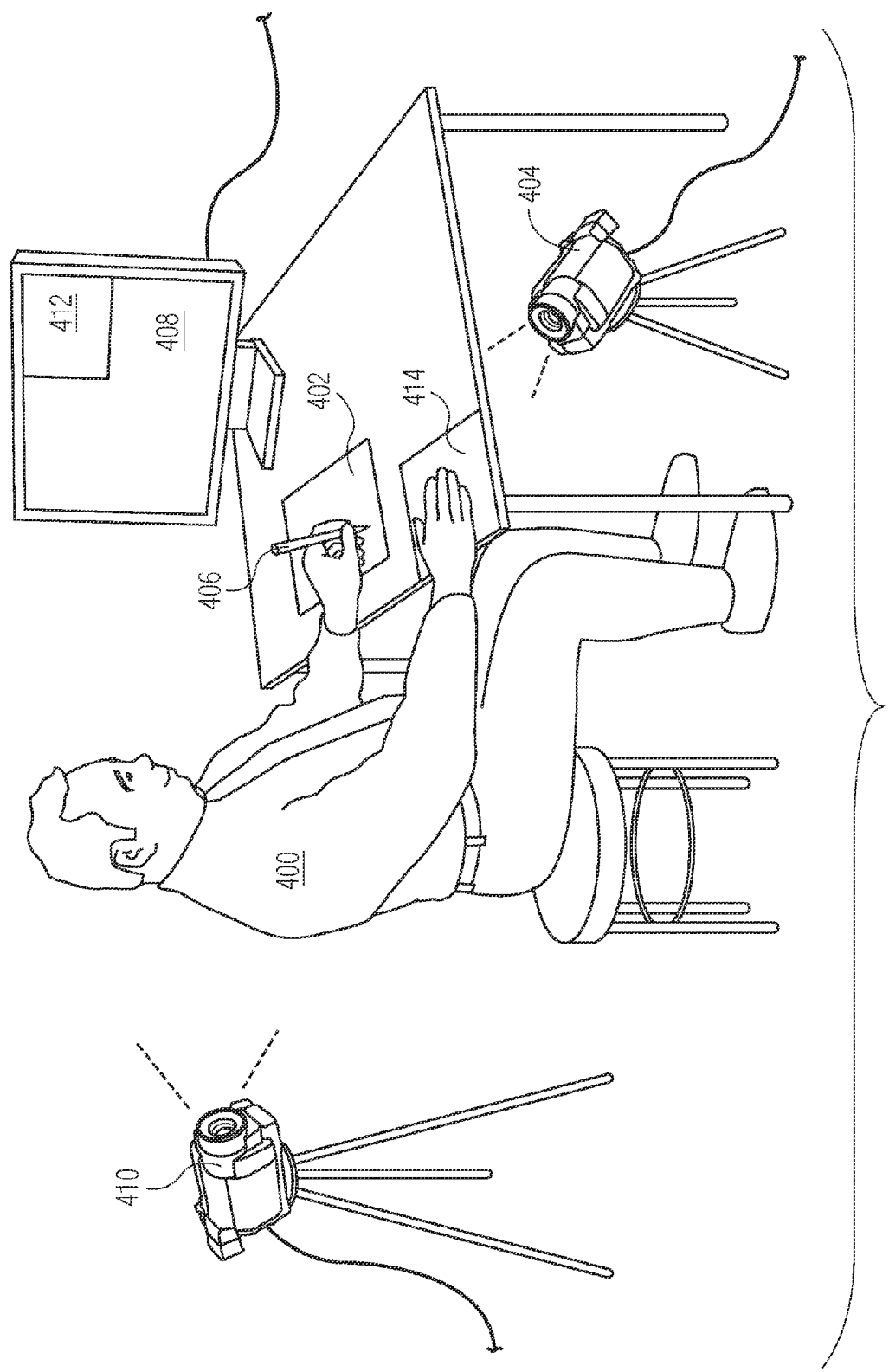
FIG. 4A is a representational diagram of apparatus for determining a user choice and a biologic identifier of the user.

FIG. 4A shows another example of apparatus which may be used in:

A) the registration process;
B) the voting process; or
C) both A) and B).

In the registration process, person 400 signs his name on 402. 402 may represent:

A) a transparent or semi-transparent surface which allows the signature to be recorded by video camera 404;
B) a touch sensitive screen with enough resolution to provide a good quality copy of the signature;
C) a paper which, when used in conjunction with pen 406 containing indelible ink, results in a non-erasable signature which may then be scanned into a computer (using a scanner, as is known in the art, not shown in the figure); or
D) other devices for converting signatures to a permanent, storable record, as are familiar to those skilled in the art.

When scanning is complete, the signature and the person's name are entered into a database; the entry indicates the association of the signature and the name. Alternative embodiments include embodiments in which:

A) other alphanumeric data relating to the registrant are also entered into the database, such as one or more of:
  1) the home address;
  2) the social security number;
  3) one or more telephone numbers; and
  4) one or more email addresses; and/or;
B) other biologic data is also inputted into the database. Visually identifiable biologic data include:
  1) fingerprints of one or more fingers;
  2) palm prints;
  3) a detailed view of the person's face; In the figure, video camera 404 is used for such recording;
  4) a voiceprint; and
  5) iris and/or retinal patterns.

When the apparatus in FIG. 4A is used in the voting process, screen 402 may have A) touch sensitive features, with the capability of recording a voter choice based on either
  1) the position of the voter's finger; or
  2) the position of a stylus held by the voter touching the surface of the screen; and
B) the capacity to input the signature of voter 400.

In an alternate embodiment of the invention, screen 402 may serve to capture the identifying signature and screen 408 may function:

A) as a conventional computer screen, showing the ballot, with choices selected using conventional point-and-click technology (mouse driven, keyboard driven or other options known in the art); or
B) as a touch sensitive screen which shows the ballot and allows for entry of the voter choice.

An image recorded by camera 404, if screen 402 is transparent, confirms that the voter is the person that he claims to be. An additional video camera 410 may be placed behind and, if necessary, somewhat to the side of (or above) person 400, and may be pointed at mirror 412. With proper placement of 410 and 412, and proper angulation of 412, camera 410 may visualize one or more of:

A) screen 408;
B) the signature of voter 400 on 402; and
C) the face of voter 400.

Embodiments with larger or smaller numbers of cameras are possible.

The apparatus of FIGS. 3 and 4A may also be used in situations other than voting in which it is of great importance to know with a high degree of certainty the identity of a person who is sending or exchanging information from a remote location. Such situations include but are not limited to signing contracts and other legal documents, making purchases, funds transfers, and the exchange of medical, legal, political or financial information.

Since even biologic data (e.g. facial features) may be altered, it should be clear that the greater the number of simultaneously monitored biologic features, the less the chance of deceiving the person or institution that receives the information.

Figure 4B:
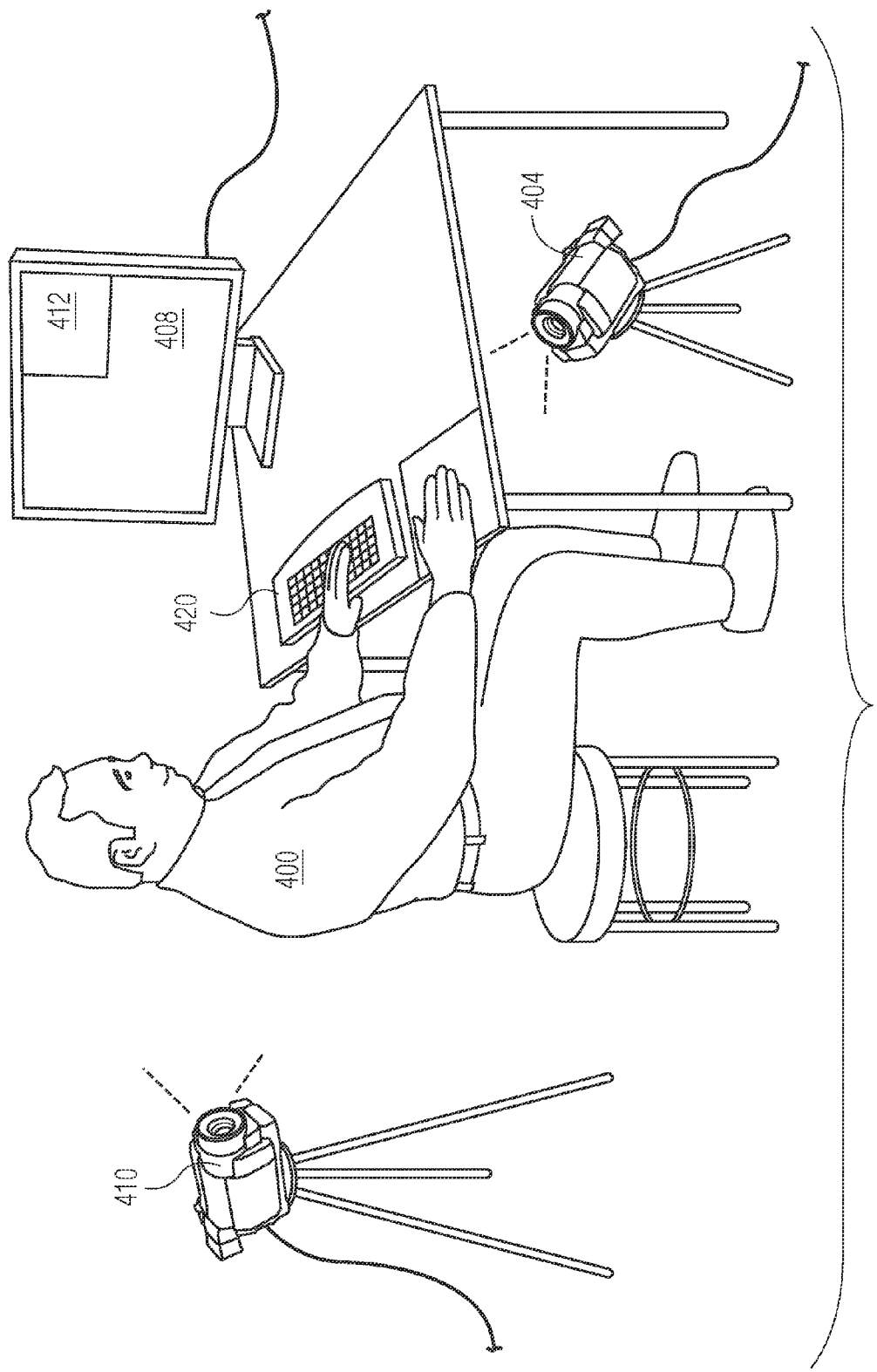
FIG. 4B is a representational diagram of apparatus for determining a user choice via keyboard and a biologic identifier of the user.

FIG. 4B shows a version of the apparatus similar to that shown in FIG. 4A, except that writing surface/touch sensitive screen 402 has been replaced by keyboard 420. All of the specification in conjunction with FIG. 4A is applicable to the apparatus shown in FIG. 4B. If 420 is a conventional keyboard, then keyboard entries will not be seen from camera 404; They will be viewable from 410, with a proper geometric arrangement of 410, 408 and 412, as discussed hereinabove.

In an alternate embodiment of the invention, a largely transparent keyboard could be used for 420. This would facilitate 404 observing the face of 400.

Figure 4C:
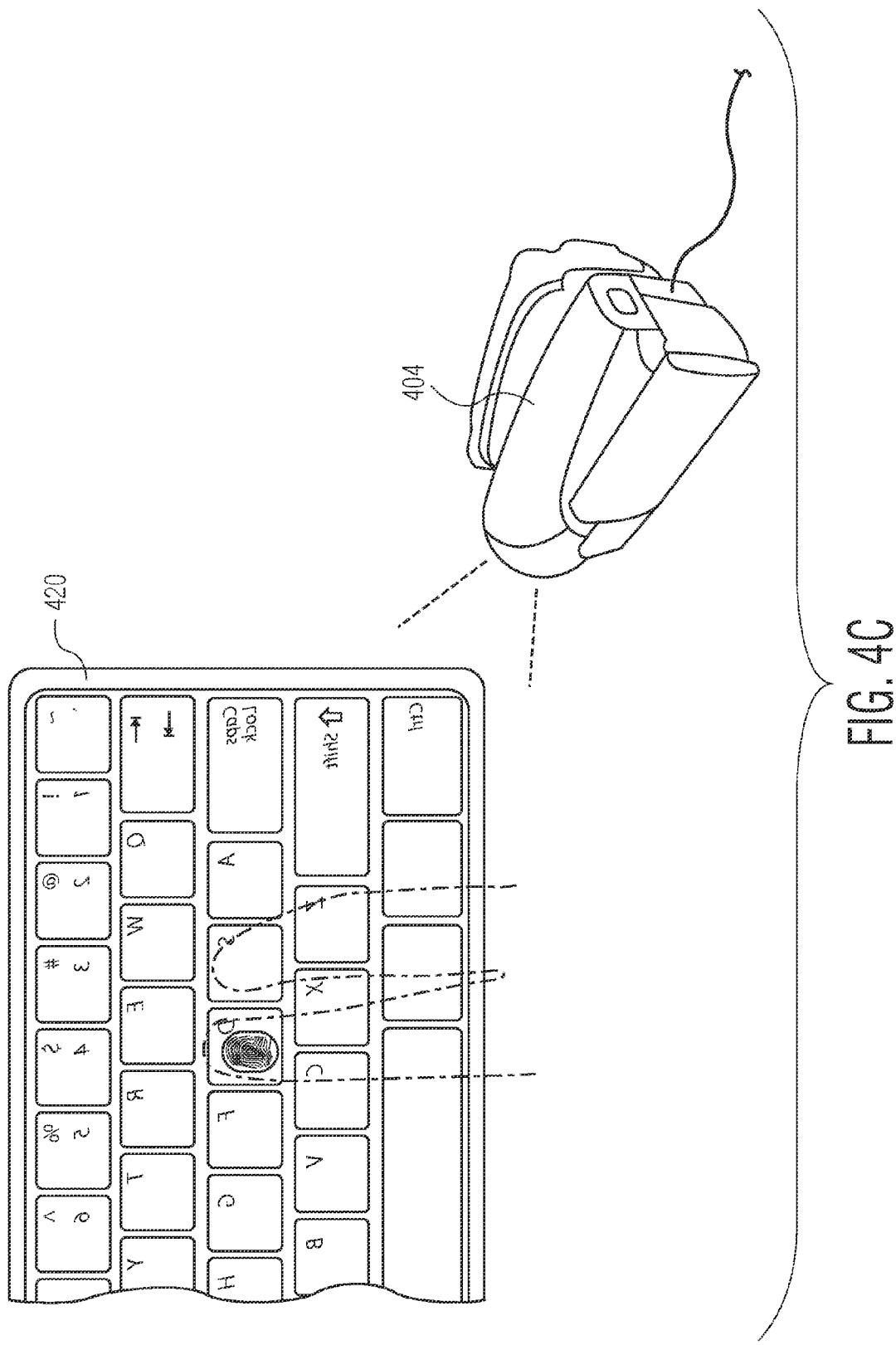
FIG. 4C is a representational diagram of apparatus for determining a user choice via keyboard as seen from below and a biologic identifier of the user.

Furthermore, a keyboard in which the key surfaces are largely transparent—shown in FIG. 4C—would allow simultaneous observation of both:

a) the user's fingerprint, and
b) the sequence of selected keystrokes.

In the figure, camera 404 is positioned underneath keyboard 420 to show both fingerprints and keystrokes in each image.

Figure 4D:
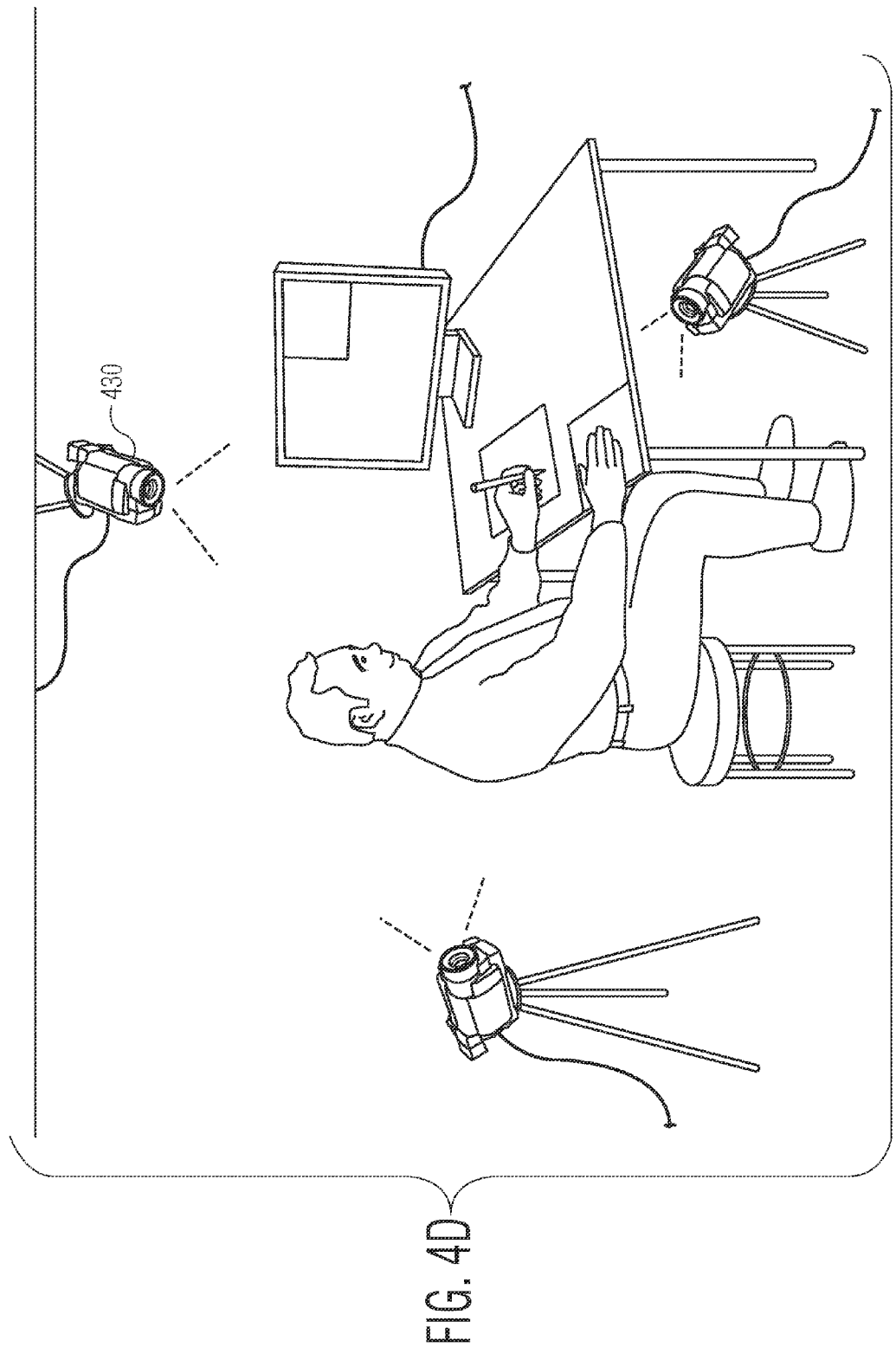
FIG. 4D is another representational diagram of apparatus for determining a user choice and a biologic identifier of the user.

FIG. 4D shows an example of apparatus similar to that of FIG. 4A, with the addition of ceiling mounted camera 430. The purpose of the overhead camera is to simultaneously visualize both the face of the user and the writing itself. The camera need not be ceiling mounted, and could be in a variety of locations. The individual need not be writing, and could be using either a keyboard or a touch sensitive screen.

Figure 4E:
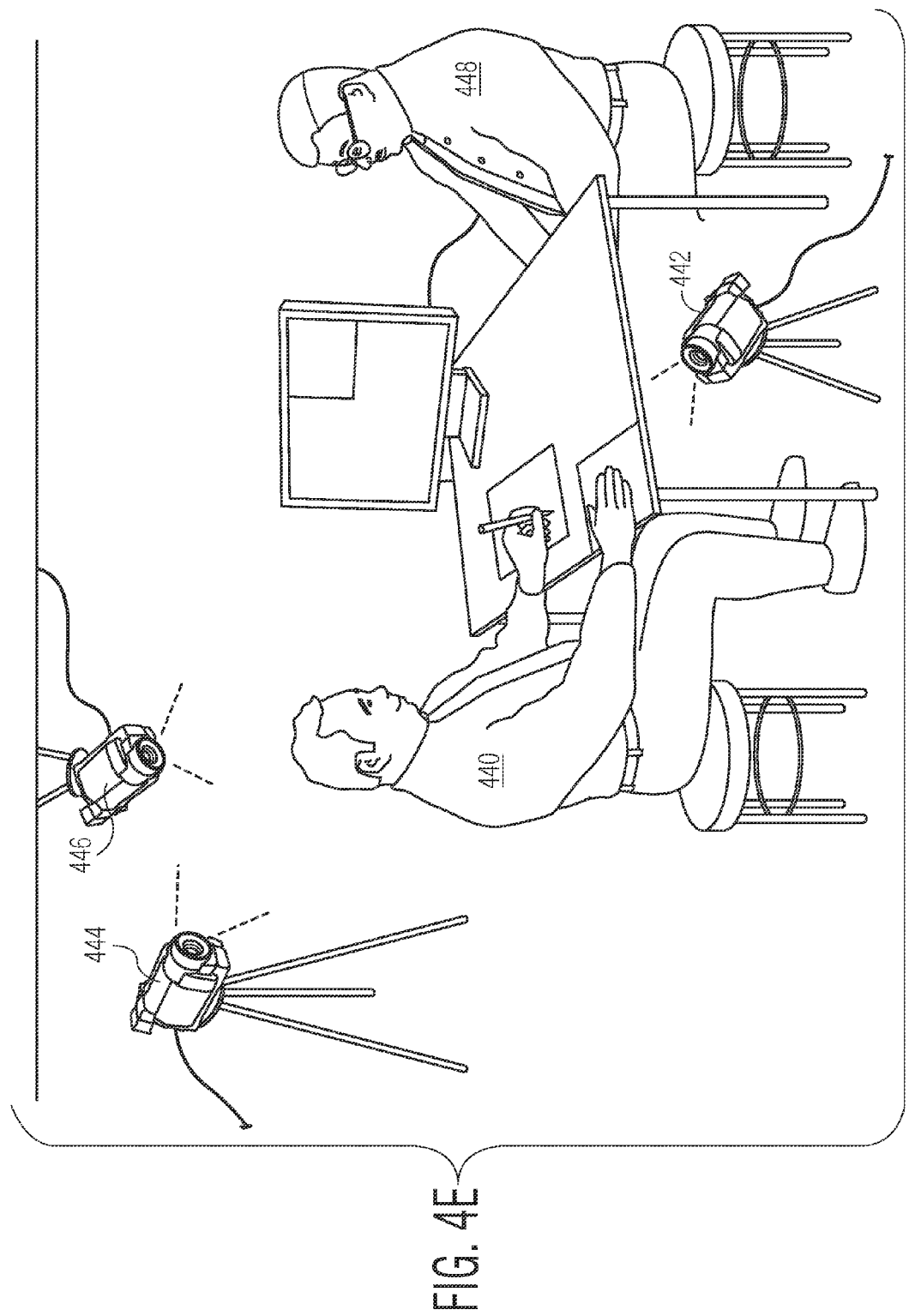
FIG. 4E is a representational diagram of apparatus for determining a user choice a biologic identifier of the user, and a biologic identifier of a witness to the user choice.

FIG. 4E shows the same apparatus as that of FIG. 4A with the addition of a witness 448. In one version, the witness functions as a conventional witness, i.e. he may sign a document indicating that he witnessed the writing by person 440. In another version, he may, exchange places with 440, after 440 completes his writing, and the same process (as is described in the specification hereinabove in conjunction with the apparatus shown in FIG. 4A) which records one or more images of 440 may then record one or more images of witness 448 as he signs indicating his witnessing. In conjunction with the aforementioned two versions, the functioning of camera 442 is analogous to that of 404 in FIG. 4A, and the functioning of camera 444 is analogous to that of 410 in FIG. 4A. Preferably person 448 is a person who has previously undergone the registration process described hereinabove, so that his being an identifiable witness is established. In a preferred embodiment, an identifying image of the witness is captured within the same camera image as at least one of (i) an identifying image of the writing person 440, and (ii) the written material. A variety of camera locations and orientations, and, if desired, mirror location(s) and orientations may be used to accomplish this task; Cameras 444 and 446 illustrate two possible camera locations for this task.

In another embodiment of the invention, the witness may be located elsewhere, e.g at the central station such as the location of the server. As shown in FIG. 4F, at that location, the witness 450 may view a video screen 454 showing the voter casting a vote, and showing, substantially simultaneously, a biologic identifier of the voter. The witness may further observe registration information about the voter (either obtained previously or at the same time as the vote), which indicates that the association between the name of the voter and a biologic identifier of the voter. The witness, having obtained convincing evidence that the voter is the person who he claims to be, then affirms the vote—by either a keyboard 452 entry, by writing, or a voice entry. One or more of cameras 456 and 458 may image such affirmation for archival purposes. In a preferred embodiment of the invention, all of this information is stored digitally, in each component in association. For example, one computer file may be constructed which contains all of (a) the name of the voter and other voter demographic and/or text identifiers (e.g. address, social security number), (b) a biologic identifier of the voter (e.g. face or fingerprint), (c) the voter's vote, (d) the name of the witness and other witness demographic and/or text identifiers, and (e) a biologic identifier of the witness, such as an image of an identifiable body part. In one embodiment of the invention, all of these items may be stored on either a write-once-only medium, or in multiple locations (at least one of which is one of (i) the voting machine and (ii) a central computer or server), suitably encrypted by methods and means known in the art, to maximize security.

Figure 4G:
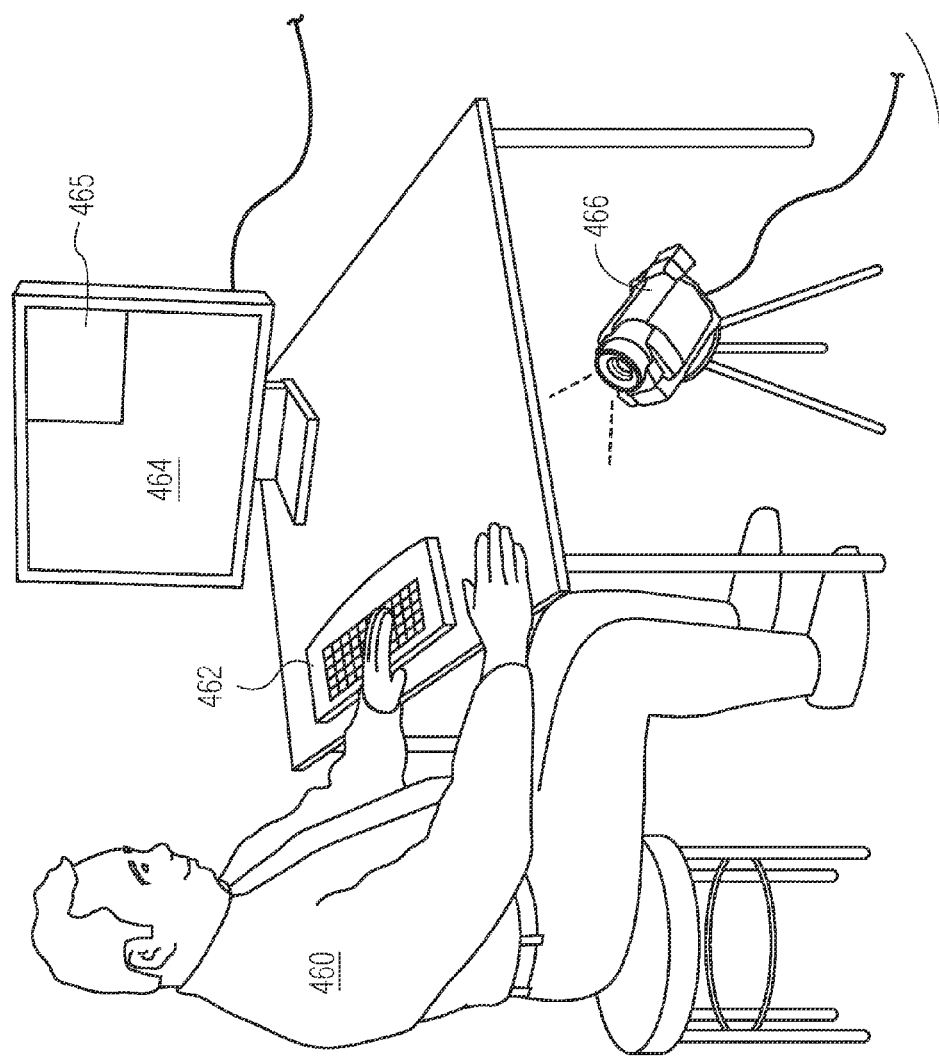
FIG. 4G is a representational diagram of apparatus for imaging each of a witness, a biologic identifier of the witness, and a remote user of the voting system, in a single image.
Figure 4G:
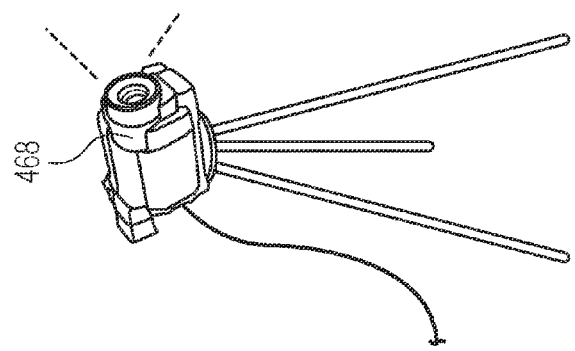

FIG. 4G shows another embodiment of the invention in which the witness 460 is located remotely from the voter. A video camera images the voter in the process of voting (such that the voters vote and a biologic identifier are visible in the same image) and displays that image for the witness on screen 464. The witness affirms his observations of the voting event, either by keyboard 462, voice or writing. Camera 466 inputs a video image from below, as described in the case shown fro FIG. 4F. Camera 468, oriented so that it records both the contents of screen 464 showing the voter in action and 465, a reflective portion of the screen showing the face of the witness 460, records within a single image both the witness observing the voter vote, and the voter voting. Storage of the data is as described hereinabove in conjunction with FIG. 4F.

Figure 4H:
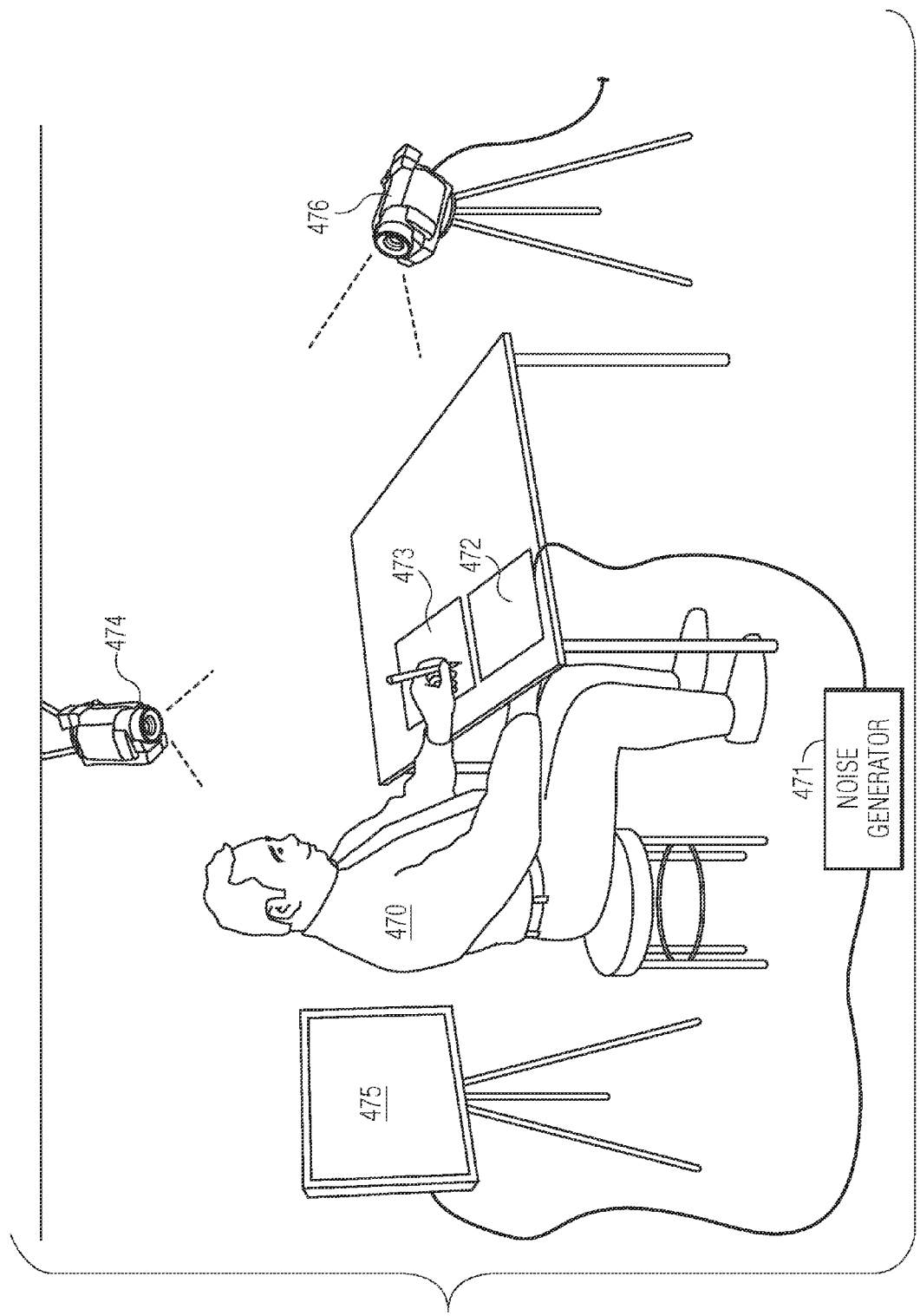
FIG. 4H is a representational diagram of apparatus for determining a user choice and a biologic identifier of the user, for use with one or a plurality of users.

FIG. 4H shows a person 470 who may be either a witness, a voter, a registration person or other person using the system to be reliably identified. He is recording a vote (in the case of a voter) or other written statement which is to be archived on 473 (which, alternatively may be substituted by a keyboard). Random noise generator 471 generates a pattern of "snow" which is shown on both screens 472 and 475. Camera 476 images the face of the person and screen 475; while camera 474 images the written material and screen 472. Since a high resolution image of each screen, acquired in a very short time, is expected to provide a level of detail that would be very difficult to "forge", because of the random pattern of the visualized noise, the pair of images (one showing the vote/witness affirmation/registration, and one showing the face of the person) may be considered to have been acquired simultaneously. Furthermore, a second pair of such images—so that there is one pair for the voter, and one pair for the witness, would provide a composite file of the witnessed voting event. Furthermore, if adjustment is made for the delays in signal propagation from the noise generator, the same noise image (displayed for both parties) could be employed for two individuals located in separate locations. In such a case, the noise generator could be at the location of either one (with aforementioned compensatory delay for the near image), or the generator could be situated between the two locales, such that the propagation delay from the generator site to each of the witness locale and the voter locale are the same or very similar.

Figure 5:
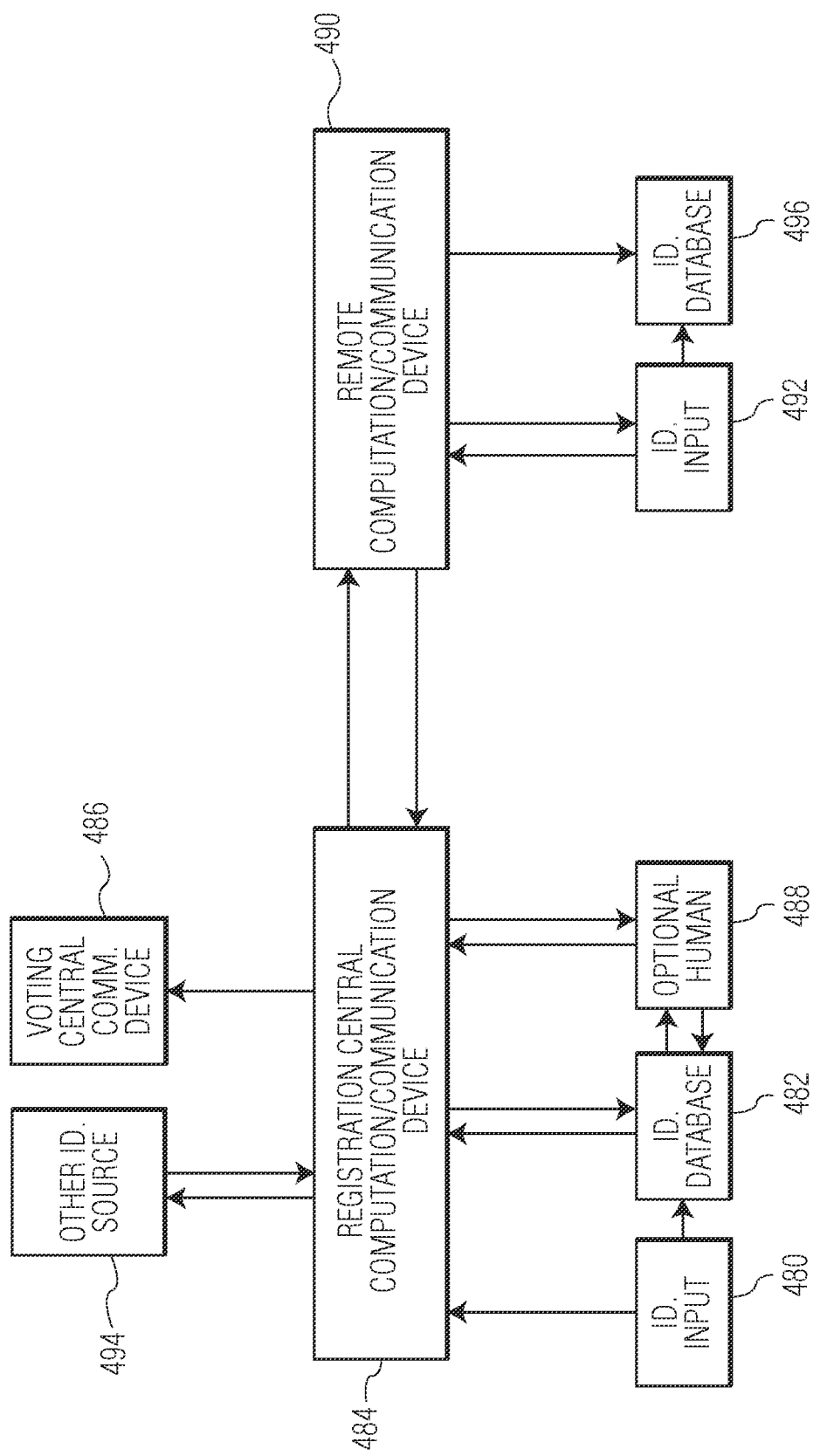
FIG. 5 is a block diagram illustrating the use of a voting system for registering users of the system.

FIG. 5 shows apparatus which allows for a number of different registration formats. Hereinbelow, "ID." refers to a stored copy of two items for identifying the same person (e.g. name and fingerprint; name and signature; name and picture).

Format 1: Registration at a registration station ("RS"); only one copy of registrant's ID. allowed.

In Format 1, the eligible voter, is physically present at the RS, and enters his identifier (e.g. fingerprint, signature, facial picture, etc.) at that time, into ID. database 482 via ID. input device 480. This database entry is then the only copy of the registrant's identifier, in the system. Later, when the registrant votes, the registrant's vote is certified by one of three approaches:

A) The ID. database remains at the RS. When the registrant votes, the vote is processed at the RS (in the same manner as it is processed in conjunction with the description of the apparatus shown in FIG. 6 and presented hereinbelow);

B) The ID. database 482 is physically transported from the RS to a voting central station, and utilized as described in the description of the apparatus described FIG. 6 and presented hereinbelow.

C) The ID. database 482 is physically transported from the RS to the registrant's remote voting apparatus, and utilized as described in the description of the apparatus shown in FIG. 7 and presented hereinbelow.

In order to avoid tampering with a transported ID. database [cases B and C hereinabove], the data within the database may be stored in a write-once-only system such as an EPROM, an EEPROM, or other such systems as are known to those skilled in the art.

Format 2: Registration at a RS; more than one copy of registrant's ID. allowed.

In Format 2, the eligible voter, is physically present at the RS, and enters his identifier (e.g. fingerprint, signature, facial picture, etc.) at that time, into ID. database 482 via ID. input device 480. However, additional copies of the registration information may be made and transmitted (or transported) to one or more of:

A) the voting central station (via the route 482 to registration central computation/communication device 484 to 486); and/or B) the voter's remote station ("VRS") via the route 482 to 484 to 490 to 496.

Triggering the ID. transmission from the 482 to other locations may be:

A) automatic, upon entry of the ID. into 482;

B) performed automatically in response to a properly formatted request, which is transmitted from either the VRS or the voting central station;

C) only transmitted after authorization by a human.

In one such embodiment, optional human 488 (i) receives such a request via 484 to 488, and, if transmission of the ID. is appropriate, (ii) signals both 482 and 484 to enable such a transmission. (Embodiments in which only one of 482 or 484 is signaled are possible.)

Format 3: Registration using ID. sources other than the actual registrant.

In Format 3, the ID. information comes to the RS from an outside source 494 other than the registrant at a remote site (the latter being Formats 4 and 5 hereinbelow). An example would be a teacher registration database which contains teachers' fingerprint records. The record could be imported via the route 494 to 484 to 482. The request to release the record could come directly from the eligible voter wishing to register or from the human in the RS, 488 to 484 to 494, after an authorization to obtain the ID. information from the eligible voter.

Alternatively (or in addition to the above), the ID. may be imported into the VRS database 496 along the route 486 to 484 to 490 to 496 (with or without notification of 488 and with or without the permission of 488). A route for this task which directly links 486 and 490 (not via 484, and not shown in the figure) is also possible.

Format 4: Registration at a remote station, without transmission of ID. at time of registration.

Although possible in principle, this format would have limited or no use for government systems, unless a local or widespread (national or international) standardized identification system was in place. ID. transmission is unnecessary in this circumstance because, with such a standardized identification system in place, everyone covered by such a system would essential be pre-registered.

Format 4 is also workable for shareholder voting. In this circumstance, the corporation would notify the shareholder of the date, time, mechanism for vote transmission and means of identification at the time of transmission. One could argue that this circumstance is, in principle, indistinguishable from Format 2, because registration could be considered to have occurred at the RS at the time of stock purchase.

Format 5: Registration at a remote station, with transmission of ID. at time of registration.

Like Format 4, this format also has limited usefulness because of the difficulty in verifying that the registrant is the person that they claim to be. Although various mechanisms for accomplishing this task may be performed using the apparatus in FIG. 4, these mechanisms can not be considered to be as foolproof (in terms of preventing unauthorized voting by one person who has stolen the ID. of another person) as those of Formats 1, 2 and 6.

Format 5/Approach 1—simple ID. transmission:

In this Approach, the voter ID. is simply inputted at the VRS at 492, and then:

(i) transmitted by 490 to 484 and then entered into database 482; or (ii) transmitted by 490 to 484 and then entered into database 482; and directly entered into database 496 (with or without notification of 488 and with or without the permission of 488); or (iii) transmitted from 492 to 490 to 484, then entered into database 482, and then (either automatically, or at the command of 488) entered into the remote station ID. database 496, along the route 482 to 484 to 490 to 496.

Format 5/Approach 2—ID. transmission with ID. confirmation using another ID. source:

In this Approach:

Step A) the voter ID. is inputted at the VRS at 492, transmitted by 490 to 484 and then temporarily entered into database 482.

Step B) Human 488 must then confirm the ID. by obtaining confirming information about the potential registrant's ID. from another ID. source of information: 488 to 484 to 494 to 484 to 488.

Step C) Human 488 then obtains the version of the voter ID. which was transmitted from 492 and is stored temporarily in 482, and compares it to the version obtained from 494. If the two versions are a reasonable match, then the human may convert the temporary entry of the ID. in 482 to a permanent one.

An alternate embodiment of Format 5/Approach 2 would, in step A), have the voter ID transmitted from 492 to 490 to 484 to 488. If the human finds a satisfactory match of the two versions of the ID. in step C), he then enters the ID. into database 482.

Still other alternate embodiments of Format 5/Approach 2 involve the storage of the ID. (which was inputted at 492, and confirmed using 486):

(i) only in 496, the remote station ID. database; or
(ii) in both 496 and 482.

Format 6: Registration at Voting Central Station ("VCS")

This format will be inconvenient, unless the voters are distributed over a geographically small area, in the vicinity of the VCS. This Format has the advantage of the greatest level of security, in that two steps in the registration process, during which security may be comprised, have been eliminated:

A) in the transmission (or transportation) of the ID. from the RS to the VCS, and
B) in the transmission of the ID. to the RS (if this step is part of the chosen format).

Figure 6:
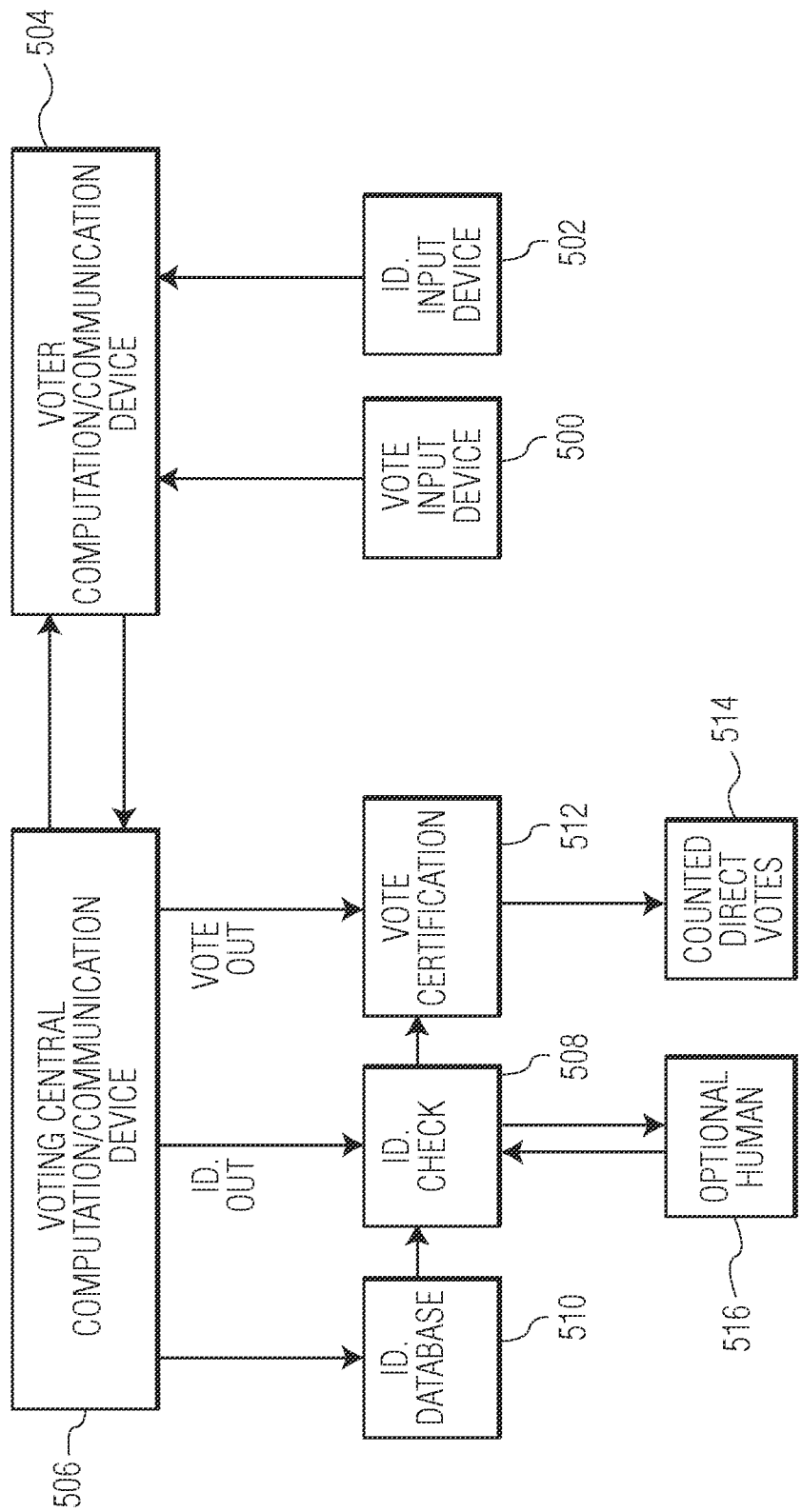
FIG. 6 is a block diagram illustrating the use of a voting system in which user identification is verified at a central location.

FIG. 6 shows apparatus within a voting central station at which voter identification takes place at the time of a vote. The apparatus:

A) receives votes and identification from individual voters at remote locations;
B) verifies that the voter was previously properly registered;
C) verifies that the voter is the person who he says he is;
D) provides optional human intervention, in the voter identification process: and
E) provides an output consisting of a list of the counted votes which support each ballot choice, for each election (i.e. candidate, proposition or other voted upon issue).

At the time of an election, the voter inputs:

A) his choice, via input device 500; and
B) his identification (e.g. fingerprint pattern, signature, picture) via 502.

In a preferred embodiment of the invention, the information is formatted, encoded and optionally encrypted (each step using techniques that are familiar to those skilled in the art). It is then transmitted from 504 at the VRS to 506 at the VCS. The information is then decrypted (if it had been encrypted), and decoded. ID. checking apparatus 508 then compares the ID. outputted from 506 with the ID. stored in database 510. If the ID. properly matches, the vote output [indicating the voter's choice(s)] from 506 is certified by 512 and formatted for outputting as counted direct votes 514.

Database 510 ID. information is supplied by either:

A) transmission of the ID. information from the RS;
B) transportation of the ID. information from the RS; or
C) directly, if the voter registers at the VCS.

Each of 508, 510 and 512 may be or may be executed by:

A) one or more computers; and/or
B) part of a computer (including one or more microprocessors, or part of a microprocessor).

Two or more of 508, 510 and 512 may be or may be part of the same computer or the same microprocessor.

In the event of an ID. check at the time of a vote, which does not yield a proper match, the results may be submitted to optional human 516 for further assessment. In alternate embodiments of the invention, human 516 may, at the time of a vote, check:

A) all ID.s;
B) only borderline matches (and not grossly mismatched ID.s);
C) all mismatches and a sample of proper matches; or
D) all borderline mismatches and a sample of proper matches.

As shown in FIG. 6, two of the elements of the VRS, 500 and 504, may be part of a telephone or personal computer. The third element, ID. input device 502 may be a part of some telephones and some personal computers (e.g. a video camera). The apparatus shown in FIGS. 3 and 4A-4H represent a high degree of identification certainty; That apparatus may be linked to a telephone or computer to assemble the VRS (500 plus 504 plus 502) shown in FIG. 6. Alternatively, less sophisticated ID. input devices may be acceptable. In summary, a VRS with the architecture shown in FIG. 6 could be assembled/built from (i) either a mobile telephone, a personal computer, a hybrid handheld device (i.e. one which has capabilities of a computer and a telephone) and (ii) a user ID. input device (if such ID. device is not part of the telephone/computer (i)).

Figure 7:
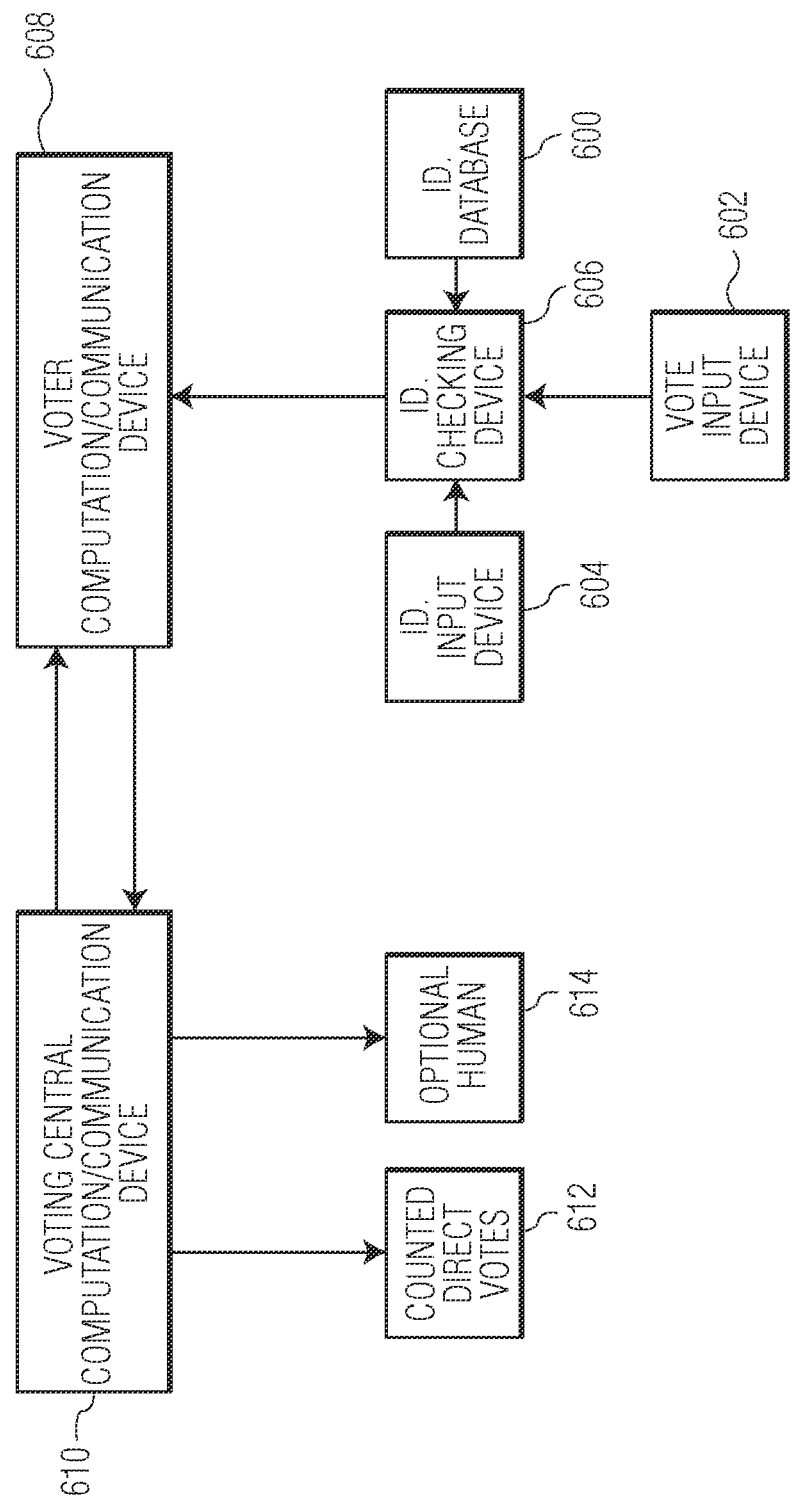
FIG. 7 is a block diagram illustrating the use of a voting system in which user identification is verified at a voting machine.

FIG. 7 shows apparatus within a VRS at which voter identification takes place.

The VRS ID. database 600 receives its information, as indicated above in the specification associated with FIG. 4. At the time that the registered voter wishes to vote, he inputs his vote via 602, and his identifier via 604. The identifier is compared with the data in 600; If there is a match (or if the degree of matching exceeds a previously determined threshold), then the vote is passed by 606 to 608, and then to 610. After decryption (if encryption occurred prior to transmission), decoding and processing, a list of direct voter votes and the choices to which they correspond, 612, becomes available.

If 606 finds a non-match, it rejects the vote, and may notify the optional human 614 in the VCS along the route 606 to 608 to 610 to 614.

The VRS in FIG. 7 consists of elements 600, 602, 604, 606 and 608. Analogous to the discussion in conjunction with FIG. 6 hereinabove, 602 and 608 may be part of a telephone, part of a personal computer, or part of a hybrid device with both functions. In order to build a VRS with the architecture shown in FIG. 7, the requirements would be (i) either a cell/mobile telephone or personal computer, (ii) a user ID. input device, and (iii) an ID. database and checking device. The items in (iii) could easily be incorporated into a personal computer; a telephone with adequate memory capacity would also accommodate them. The ID. device whether camera, microphone or both are easily incorporated or standard phone features.

Figure 8:
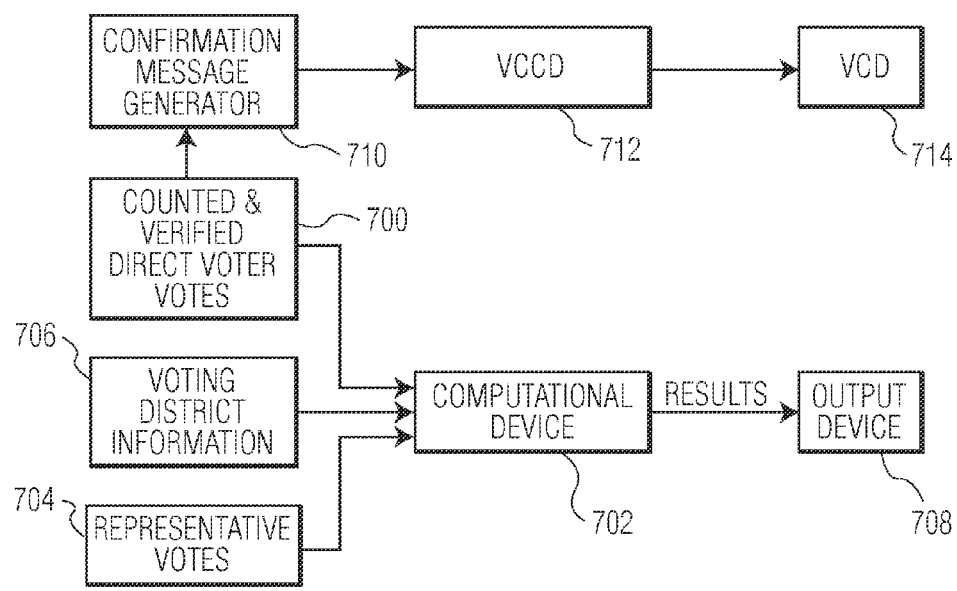
FIG. 8 is a block diagram illustrating the use of a voting system in which individual voters as well as voter representatives may vote.

FIG. 8 shows apparatus in a VCS for doing the computations required for direct voter voting in a representational government system, as discussed in U.S. patent application Ser. No. 11/595,655.

Counted and verified votes 700 are the output 514 of the apparatus shown in FIG. 6 (and the output 612 of the apparatus shown in FIG. 7). These votes are inputted into computational device 702 (which may be one or more computers, servers, parts of a computer, parts of a server, or one or more microprocessors or a part of a microprocessor).

In a government system in which each direct vote carries an equal weight, the votes are simply summed.

In government systems in which
  A) elected representatives vote, serving as the proxy for voters who do not directly vote on a legislative issue, and
  B) direct voters vote on the legislative issue, a more complex computation is required (discussed in Ser. No. 11/595,655). The computation requires
  A) inputting the representative votes 704, and
  B) inputting information about the population of each voting district 706.

Following the appropriate arithmetic processing (as discussed in Ser. No. 11/595,655), 702 outputs its results to device 708 which may be a display device, another computer or server (with or without Internet interface), a printer, and/or a communication device.

The architecture for a system which may be used for counting shareholder-determined votes is analogous to that of FIG. 8. In the shareholder voting version:
  700 remains the direct voter votes;
  706 is replaced by information which includes:
    A) the number of shares each shareholder owns; and
    B) the class of each share, when there is more than one class of stock;
  704 is replaced by:
    A) the votes of those persons physically present at a shareholder meeting and
    B) proxy votes assigned to those physically present at a shareholder meeting. Embodiments of the invention in which proxy votes may be voted by direct voters are also possible.

FIG. 8 also shows that in a preferred embodiment of the invention, the apparatus at the VCS, after counting a direct vote, generates a confirmation message 710 for the voter, indicating that the vote was counted, and preferably confirming that the direct voter's choice(s) was/were properly recorded. The confirmation message is transmitted from the voting central computation/communication device 712 to the voter computation/communication device 714.

Figure 9:
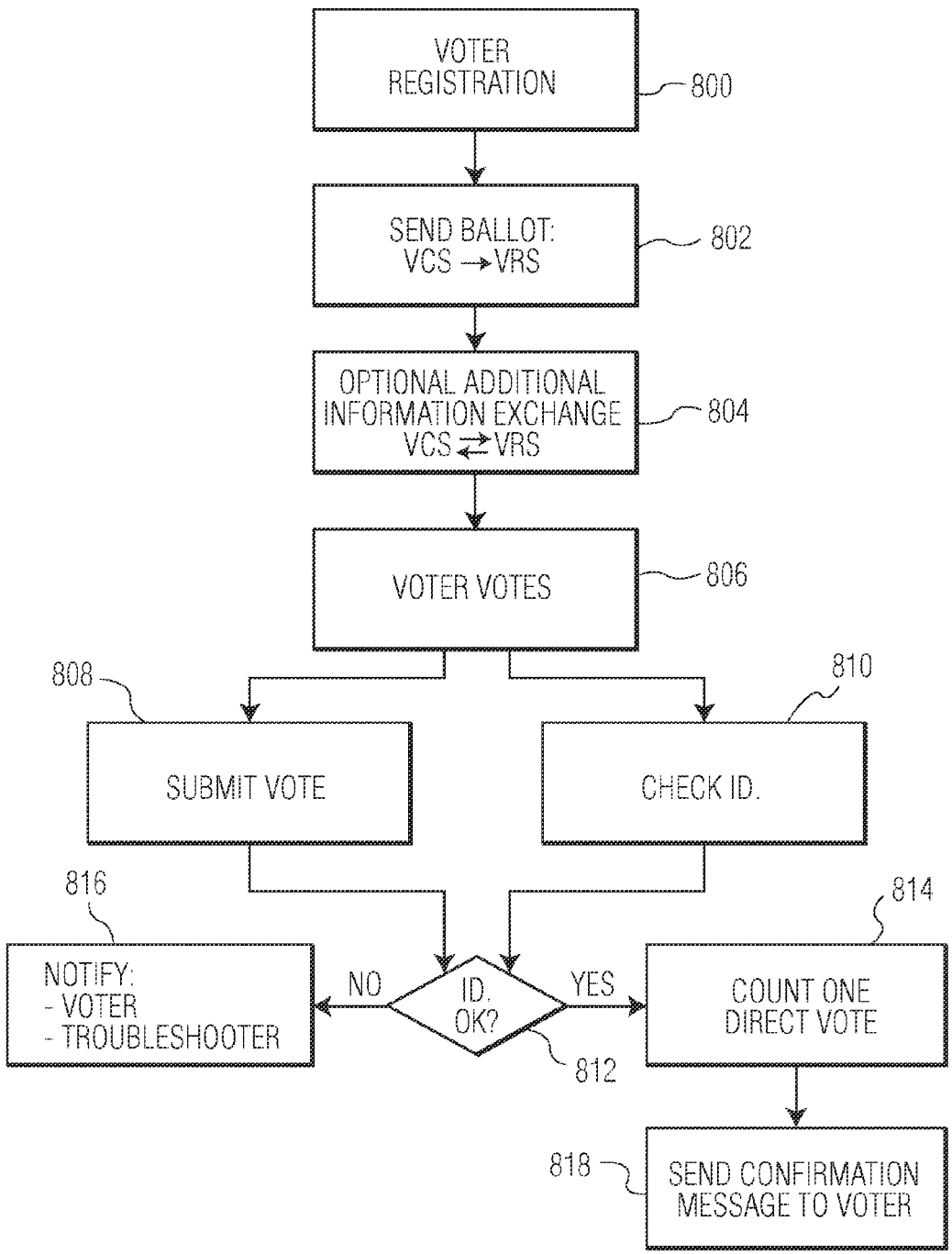
FIG. 9 is a block diagram illustrating the use of a voting system in which voter identification and vote confirmation occur.
Figure 10:
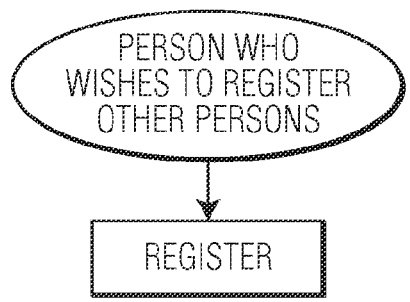
FIG. 10 is a block diagram showing a registration requirement for a person who wishes to register other persons in a voting system.
Figure 11:
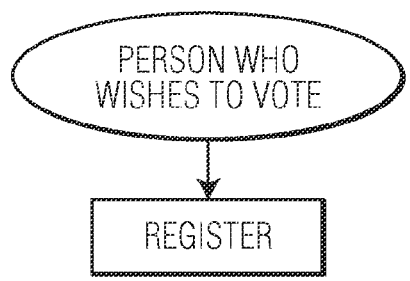
FIG. 11 is a block diagram showing a registration requirement for a person who wishes to vote in a voting system.
Figure 12:
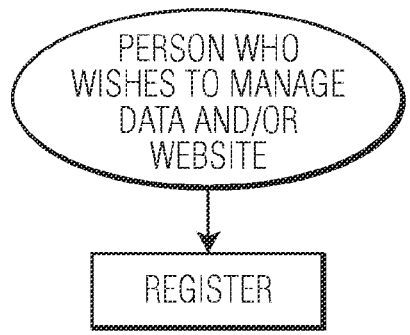
FIG. 12 is a block diagram showing a registration requirement for a person who wishes to manage data and/or a website in a voting system.
Figure 13:
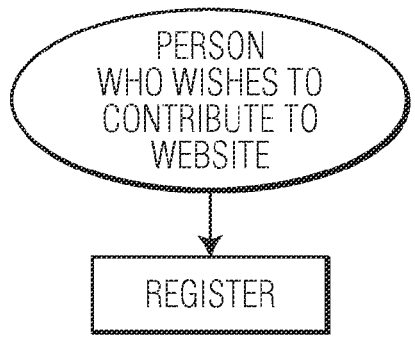
FIG. 13 is a block diagram showing a registration requirement for a person who wishes to contribute to a website in a voting system.
Figure 14:
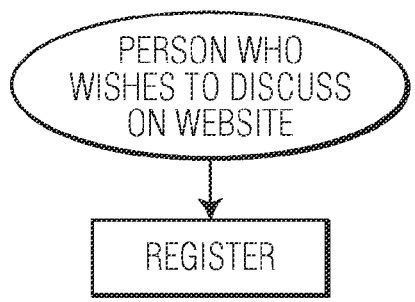
FIG. 14 is a block diagram showing a registration requirement for a person who wishes to discuss a voting matter on a website-based voting system.
Figure 15:
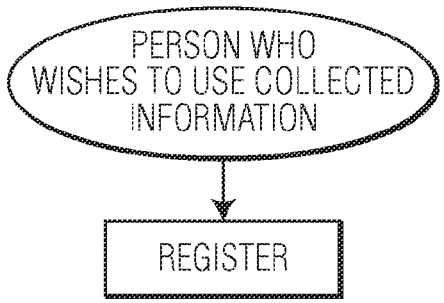
FIG. 15 is a block diagram showing a registration requirement for a person who wishes to collect voting system information in a voting system.

FIG. 9 shows a flow diagram for the operation of the apparatus shown in FIGS. 1-7. Following the registration 800 of an eligible voter who wishes to vote by direct voting, a ballot is sent to the direct voter, block 802, when a government decision must be made. There may be additional information exchanged between the VCS and the VRS including:
  A) educational/background material concerning the voting decision(s) to be made;
  B) discrepancies, if any, concerning the acceptability of the direct voter's ID; and
  C) voter questions about procedural issues related to the use of the direct voting system.

Next the voter makes his voting choice(s), block 806, and submits the information about the choice(s), block 808, and the identifying information which was inputted at the time of his voting, which is checked, block 810.

If the check reveals that the identification is proper, block 812 to block 814, one direct vote is counted for each item voted for on the ballot, after which a confirmation message is sent to the direct voter, block 818. If the check reveals that the identification is improper, block 812 to block 816, there is notification of either:
  A) the voter;
  B) a human (or automated) troubleshooter; or
  C) both.

One or more of these notified entities may then further address whether the identification which was presented at the time of the vote should be accepted or not.

Embodiments of the invention in which ID. databases have a write-once-only medium for information storage (e.g. EPROMS and EEPROMS and other devices known in the art) will minimize the chance of tampering. On the other hand, they will require the greatest amount of effort (replacement or adding additional memory units) for updating (e.g. as new names are added to the database). They are thus more attractive for a remote station ID. database than for a RS or VCS ID. database.

Embodiments of the invention in which more than one voter votes at a VRS are possible. In such a circumstance, if there is an ID. database at the VRS (as shown, for example, in FIG. 7), the database must contain the ID. of each potential voter. An extreme case of this would be to use the VRS as a voting machine in a conventional political election—e.g. the election of a state or federal official. (This use—unrelated to any re-distribution of the power of one or more elected representatives—is different than the task of serving as the conduit for the votes of direct voters as defined in Ser. No. 11/595,655.) The VRS architecture shown in either FIG. 6, FIG. 7, or an architecture in which voter ID. is confirmed at both the VRS and the VCS would each be possible.

Embodiments of the invention are possible in which one direct voter may use more than one VRS (i.e. one VRS at one time, and one at another time). This situation may occur when the voter has multiple cell phones and/or computers. In embodiments of the invention analogous to some versions of the apparatus shown in FIG. 7, in which the ID. database resides only at the VRS (i.e. not at both the VRS and the VCS), each VRS used by the direct voter would have to have a copy of the ID. database.

Embodiments of the invention in which the ID. database is part of both the VRS and the VCS are possible. In such a situation, identity confirmation at the time of voting could be:
  A) only by the VRS;
  B) only by the VCS;
  C) only if both the VCS and the VRS indicate proper identity;
  D) if either the VCS or the VRS indicates proper identity; or
  E) more complex arrangements (e.g. identification is accepted if either (i) VCS indicates a perfect match, or (ii) if VCS indicates a near-perfect match and VRS indicates a perfect match.

Other methods of using the identification data from multiple sites, including
  A) the use of the RS database and other databases; and
  B) the—in principle—limitless number of ways of weighting the goodness of the match at each site will be obvious to those skilled in the art.

Internet Voting

The rapid growth of internet users and uses makes such medium a possible venue for the roll-out of a system of more direct and substantial participation of voters in government decision making. One or more websites based on either a single bank of servers and computers, or a distributed set of them would allow direct voters to vote (with tally methods described in Ser. No. 11/595,655), propose and debate legislation, and interact with legislators.

All users of the site would need to register in advance, as discussed hereinabove for voters, and as is shown schematically in FIGS. 10 to 15.

As shown in the flow diagram of FIG. 16, in a basic version of the approach, a person who wishes to use the website signs on, confirms their identity (or signs on by confirming their identity, as discussed hereinabove). They may then access a ballot which indicates voting choices such as an election of a government official, a yes/no vote on legislation, a confirmation of an agreement such as a treaty, a confirmation of an appointment of a government official, etc. In a preferred embodiment of the invention, the voter receives a confirmation of the vote, as indicated hereinabove.

Figure 17:
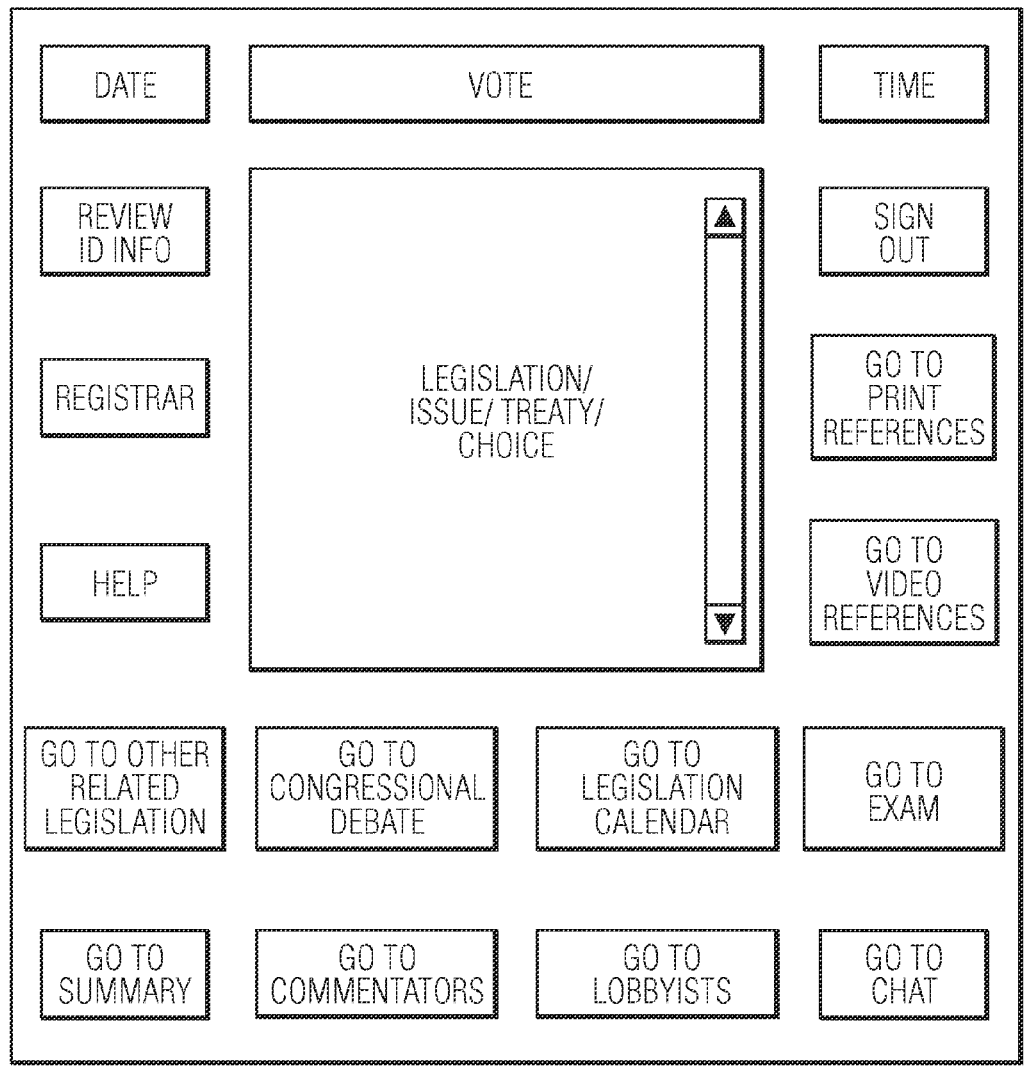
FIG. 17 is a representational diagram of a computer and/or communication device screen allowing the user to engage in remote participation in a voting system.

FIG. 17 shows one possible configuration of a user screen on the website. The central portion of this screen shows either the text of legislation to be voted upon, or an election choice (e.g. the selection of candidate). It may also show supportive material such as related legislation, the debate of elected representatives, other support materials, the views of political commentators, lobbyists and other voters. It may provide access to on-line discussion with other voters. Because of the need for proper user identification, there may be an ongoing need to renew/refresh identification data by communicating with a registrar, and by reviewing identifying information already on file. The screen, as shown, is touch sensitive, so that a voter may vote by touching the "vote" box. Keyboard entries and spoken ones are possible as well. An user examination may be performed via the screen. One purpose of the examination would be to confirm that the user is who he says he is. Another use, in one embodiment of the invention, would be to ask the user one or more test questions concerning material in the legislation, in order to determine that the user has an understanding of the matter to be voted on. Such an examination could be applied in a non-discriminatory fashion to users and to established representatives (such as Senators and members of the U.S. House of Representatives), to assure that all voters have familiarized themselves with the matter to be voted on. The answer or answers and the value of a "passing" grade would be established in advance. The examination questions could be inputted either at a central location, at a dedicated location or at a voting machine by a person with proper access to the system.

Figure 16:
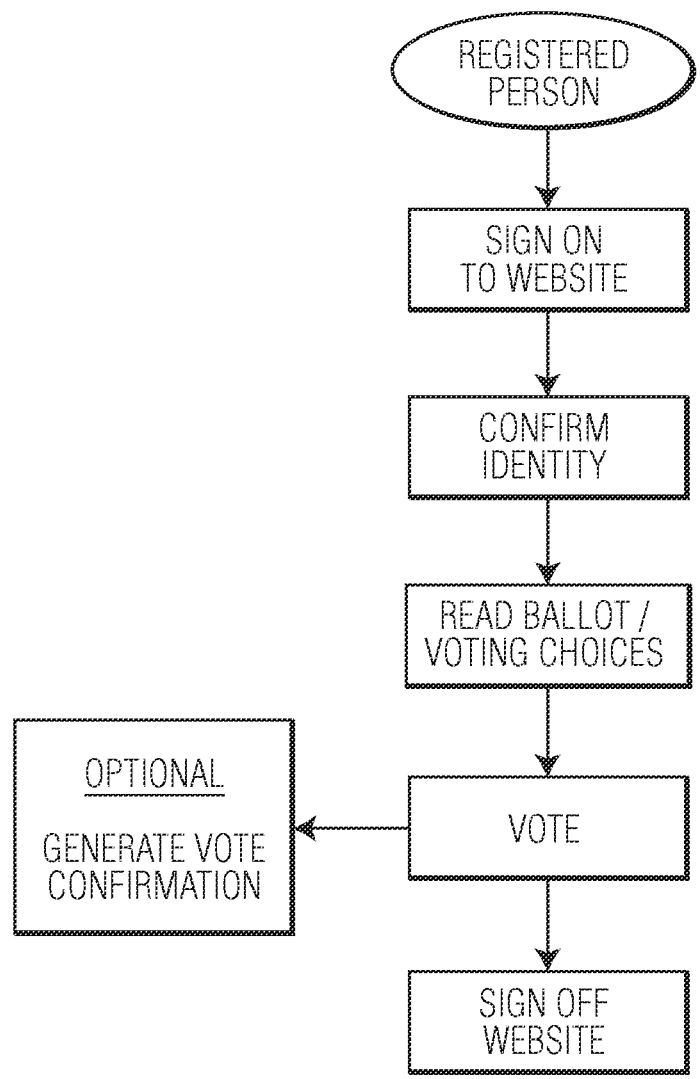
FIG. 16 is a flow diagram showing the operation of a basic voting system.
Figure 18:
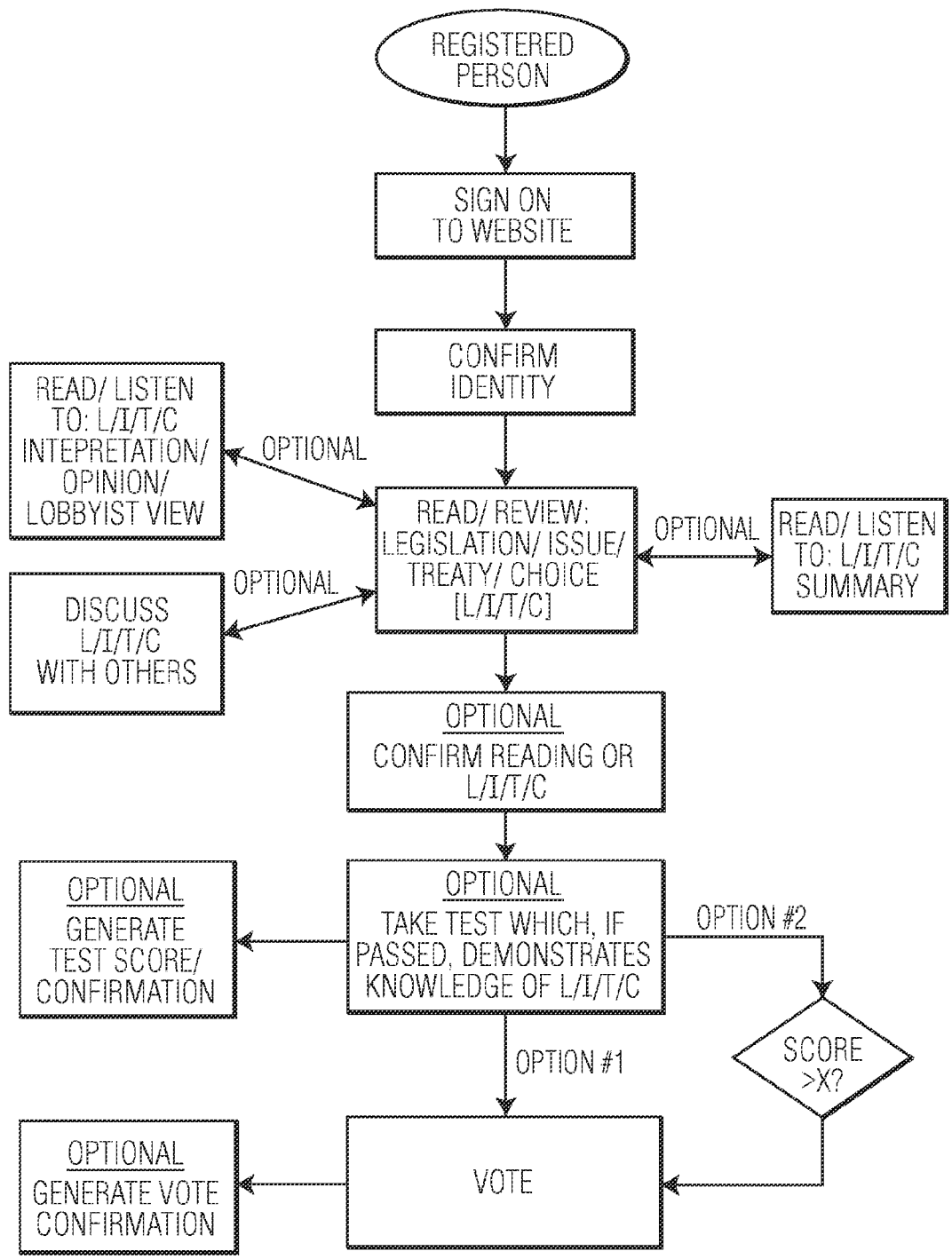
FIG. 18 is a flow diagram showing the operation of a voting system with additional user options.

FIG. 18 shows a flow diagram for using the site illustrating some of the aforementioned features, in addition to the basic operation shown by the flow diagram of FIG. 16. The figure shows two possible approaches to the test issue. Option 1 does not exclude a person from voting because of a low test score; In this case, the test is solely to let the person know the extent of their knowledge of the material being voted on. With option 2, a potential voter may be denied from a vote based on poor test performance. Many variations are possible, including (a) allowing for re-test in the event of poor performance, (b) time limits for user responses, (c) allowing the test taker to dispute whether the "correct" answer is indeed correct, etc. Besides the aforementioned vote confirmation, there may be a test confirmation as well.

Figure 19:
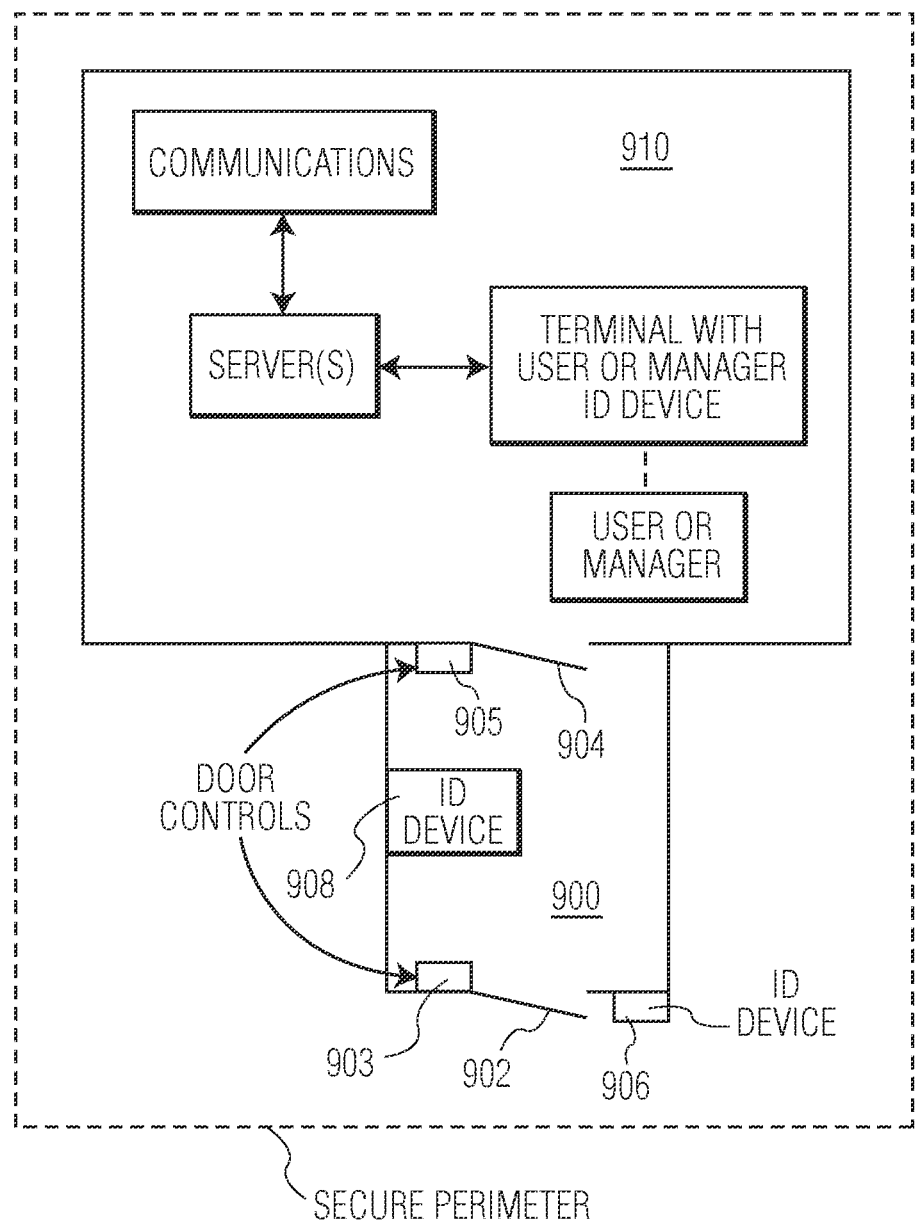
FIG. 19 is a representational diagram illustrating the positioning of a portion of a voting system within a secure perimeter, and the control of access to the inside of the secure perimeter.

Besides the aforementioned registration and identification procedures, and besides other data management security procedures and techniques known in the art, controllable physical barriers to exclude non-registered users are another way to increase security. One such arrangement is shown in FIG. 19. In order for a user to gain access, to either a server or a voting machine, one or more electronically controllable doors, responsive to the inputting of proper user identification, is required. The user is allowed access to an outer room 900, if identification inputted into ID. device 906 is a correct match for identification information on file. If the match is correct, door 903 opens door 902 under the control of electromechanical apparatus 903. Not shown in the figure, is the control of 903, which would be either by a computer which checks for an ID. match or by a person. Once in space 900, door 902 is closed behind the user, and a second identification process ensues. The entry of proper ID. information into 908 results in 905 opening door 904 in a fashion analogous to the opening of 902. Cameras and other detection devices within 900 (not shown) allow for the exclusion of an inappropriate, nonregistered and/or non-identified person from 910 who may have entered 900 along with a properly registered/identified person. 910 houses either a voting machine (i.e. VRS [voter remote station] or VCD [voter computation/communication device]) or a server for the voting system. Embodiments of the invention with only a single door control are possible. Embodiments in which a manager must first enter 910, before a user can enter are also possible.

There has thus been shown and described a novel apparatus and system for allowing a remote voter to vote directly in an election which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A system for exchanging information between a terminal of a potential user and a server for securely executing a transaction comprising:
  (1) a potential user (PU) terminal comprising:
    (A) a PU terminal processor,
    (B) a digital camera, and
    (C) a PU terminal memory storing executable instructions that, when executed by the PU processor causes the PU processor to perform the steps of:
      transmitting a request for transaction information to a server, the transaction information comprising a plurality of options;
      receiving and displaying the transaction information;
      detecting a selection by a potential user, of at least one of the plurality of options;
      based on the detecting of the selection, causing the digital camera to capture a biological image of the potential user and the selection of the at least one of the plurality of options by the potential user wherein the biological image comprises at least one of: finger, face, or iris print;
      creating a digital file comprising the captured biological image and the selection of the at least one of the plurality of options by the potential user; and
      transmitting alphanumeric information of the potential user and the digital file to the server; and (2) the server comprising:
  (A) a server processor, and
  (B) a server memory storing executable instructions that, when executed by the server processor causes the server processor to perform the steps of:
    receiving identification information of a registered user, from a terminal of the registered user, wherein said identification information comprises biological information including at least one of a finger, face, or iris print and alphanumeric information pertaining to a person allowed to execute the transaction;
    receiving the transaction information from a transaction content computer;
    receiving the request for the transaction information from the PU terminal;
    transmitting the transaction information to the PU terminal;
    retrieving the identification information using the alphanumeric information of the potential user; comparing the biological image of the digital file with the corresponding biological information from the retrieved identification information; and determining a match between the biological image and the corresponding biological information from the identification information; and
    based on the match, retrieving, by the server, the selection of the at least one of the plurality of options from the digital file and executing a transaction represented by the selection.

2. The apparatus defined in claim 1, wherein said server processor is configured to provide communication access to the Internet and wherein said server memory further comprises instructions that, when executed by the server processor, cause the processor to perform the step of providing and receiving information to and from the Internet.

3. The apparatus defined in claim 2, wherein the server memory further comprises instructions that, when executed by the server processor cause the processor to perform the step of providing an interactive web site to the Internet.

4. The system defined in claim 1, wherein said PU terminal is selected from the group comprising:
  (a) a desktop computer,
  (b) a laptop computer,
  (c) a handheld computer,
  (d) a hard-wired telephone,
  (e) a portable telephone,
  (f) a hand-held telephone, and
  (g) a cellular telephone.

5. The system defined in claim 1, wherein said biological image of the potential user and the biologic information further comprise image information selected from the group consisting of:
  (a) a palm print,
  (b) a retinal pattern,
  (c) a face and a torso,
  (d) a face, a torso and a hand, and
  (e) a signature.

6. The system defined in claim 5, wherein said digital camera is configured to provide to said PU terminal processor a plurality of composite images of the potential user and the selection, each image showing contiguous regions of each of:
  (a) the face,
  (b) the torso, and
  (c) the hand of said potential user as it inputs at least one of (i) said signature, and (ii) said selection;
  wherein the server memory further comprises instructions that, when executed by the server processor cause the processor to perform the step of comparing said images showing said contiguous regions to images with the corresponding biological information retrieved from the identification information;
  whereby said match determination comprises determining that said face, torso and hand each belong to a particular potential user; and
  thereby determining that the selection has been made by said registered user.

7. The system defined in claim 6, wherein the image of said face further comprises an image of at least one of (i) an iris, and (ii) a retinal image of said potential user.

8. The system defined in claim 5, wherein said digital camera is configured to provide to said PU terminal processor a plurality of composite images of the potential user and the selection, each image showing contiguous regions of each of:
  (a) at least one of a fingerprint and a palm print, and
  (b) a hand of said potential user as it inputs said selection;
  wherein the server memory further comprises instructions that, when executed by the server processor cause the processor to perform the step of comparing said images showing said contiguous regions to images with the corresponding biological information retrieved from the identification information;
  whereby said match determination comprises determining that said hand and at least one of said fingerprint and said palm print each belong to a particular potential user; and
  thereby determining that the selection has been made by said registered user.

9. The system defined in claim 5, wherein said digital camera is configured to provide to said PU terminal processor a plurality of composite images of the potential user and the selection, each image showing contiguous regions of each of:
  (a) at least one of a fingerprint and a palm print, on a first hand of said user,
  (b) the torso and arms of said user, and
  (c) another hand of said user as it inputs at least one of (i) said signature, and (ii) said selection;
  wherein the server memory further comprises instructions that, when executed by the server processor cause the processor to perform the step of comparing said images showing said contiguous regions to images with the corresponding biological information retrieved from the identification information;
  whereby said match determination comprises determining that said other hand and at least one of said fingerprint and said palm each belong to the same user; and
  thereby determining that the transaction selection has been made by said user.

10. The system defined in claim 1, wherein said server further comprises:
  (a) a server input device, couple to said server processor, entering alphanumeric information pertaining to a registered user of the system; and
  (b) a server digital camera, couple to said server processor, entering biologic information pertaining to said registered user of the system; and
  Wherein said server memory further comprises instructions that, when executed by the server processor cause the processor to perform the step of storing said alphanumeric information and said respective biologic information, in said server memory.

11. The system defined in claim 1, wherein:
(A) said terminal of a potential user comprises a voting machine of a potential voting person;
(B) said transaction information comprises a plurality of possible voting options;
(C) said selection is a selected voting option by the potential voting person from among a plurality of possible voting options;
(D) said registered user is a registered voting person; and
(E) the server memory further comprises instructions that, when executed by the server processor causes the server processor to determine a total number of selections of each respective option, each selection by one of a plurality of registered voting persons.

12. The system defined in claim 11, wherein:
(1) said plurality of possible voting options comprise choices concerning a proposed legislative body decision, to be determined by voting selections, and to be applied to a legal jurisdiction;
(2) a plurality of states have been established within the jurisdiction;
(3) at least one voting district has been established within each state, each state and each district having a plurality of residents residing within the respective state and district;
(4) a direct voting legislative branch has been established whose powers include voting on legislative body decisions to ensure that a will of registered users is known and acted upon in a substantially real-time basis, said legislative branch comprising registered users who are residents of the jurisdiction; said legislative branch comprising a first unit and a second unit, said first unit determining a first voting position based on the selections of the registered users who are residents of each respective district, said second unit determining a second voting position based on the selections of the registered users who are residents of each respective state;
(5) an executive branch has been established which comprises a plurality of officers including a President whose powers include the nomination of certain judges, the proposal of legislative body decisions and the veto of legislative body decisions;
(6) a judicial branch has been established to interpret the laws of the jurisdiction, said judicial branch comprising a plurality of justices and judges;
(7) each of a plurality of said registered users may provide a registered user voting selection by selecting a voting option in favor of, or a voting option against the proposed legislative body decision;
(8) said alphanumeric information pertaining to a person allowed to execute the transaction includes information pertaining to a district and a state of residence of the authorized person;
(9) said server memory further comprises instructions that, when executed by the server processor cause the processor to perform the steps of:
  determining a district voting position pertaining to each district by determining a total number of registered user voting selections, pertaining to the respective district, in favor of, and by determining a total number of registered user voting selections, pertaining to the respective district, against the proposed legislative body decision;
  determining a state voting position pertaining to each state by determining a total number of registered user voting selections, pertaining to the respective state, in favor of, and by determining a total number of registered user voting selections, pertaining to the respective state, against the proposed legislative body decision; and
  determining acceptance of the proposed legislative body decision in the jurisdiction by determining:
    (i) the first voting position, based on a total number of district voting positions in favor of, and a total number of district voting positions opposed to the proposed legislative body decision; and
    (ii) the second voting position, based on a total number of state voting positions in favor of, and a total number of state voting positions opposed to the proposed legislative body decision.

13. The system defined in claim 12, wherein said jurisdiction is the United States of America.

14. The system defined in claim 11, wherein:
(1) said plurality of possible options comprise choices concerning a proposed legislative body decision, to be determined by voting selections, and applied to a legal jurisdiction;
(2) a plurality of states have been established within the jurisdiction;
(3) at least one voting district has been established within each state, each state and each district having a plurality of residents residing within the respective state and district;
(4) two senators representing each state are each entitled to provide a senator voting selection pertaining to the proposed legislative body decision on behalf of the residents in the respective state;
(5) a representative representing each district is entitled to provide a representative voting selection pertaining to the proposed legislative body decision on behalf of the residents in the respective district;
(6) registered users have been registered to vote within each district in each state;
(7) the server memory further comprises instructions that, when executed by the server processor cause the processor to perform the step of receiving, from at least one legislator terminal, each senator voting selection comprising an option in favor of, or an option against the proposed legislative body decision;
(8) the server memory further comprises instructions that, when executed by the server processor cause the processor to perform the step of receiving, from the at least one legislator terminal, each representative voting selection comprising an option in favor of, or an option against the proposed legislative body decision;
(9) registered users provide voting selections by selecting a voting option in favor of, or a voting option against the proposed legislative body decision;
(10) said server memory further comprises instructions that, when executed by the server processor cause the processor to perform the steps of:
  (a) determining sums of the senator voting selections pertaining to each voting option, to determine a final senate majority vote in favor of, or against the proposed legislative body decision;
  (b) determining sums of the representative voting selections pertaining to each voting option, to determine a final representative majority vote in favor of, or against the proposed legislative body decision;
  (c) determining a number of registered user voting selections in favor of, and a number of registered user voting selections against the proposed legislative body decision to determine a final registered user majority vote in favor of, or against the proposed legislative body decision; and
(d) determining acceptance of the proposed legislative body decision in dependence upon the final senate majority vote, the final representative majority vote and the final registered user majority vote.

15. The system defined in claim 14, wherein said jurisdiction is the United States of America.

16. The system defined in claim 11, wherein:
(1) said plurality of possible voting options comprise choices concerning a proposed legislative body decision, to be determined by voting selections, and applied to a legal jurisdiction;
(2) a plurality of states have been established within a legal jurisdiction;
(3) at least one voting district has been established within each state;
(4) each state and each voting district comprise a plurality of residents residing within the respective state and district;
(5) a government has been established to govern said legal jurisdiction comprising:
  (a) an elected legislative branch whose powers include voting on proposed legislative body decisions, said legislative branch comprising:
    (i) two senators representing each state who are each entitled to provide a senate voting selection pertaining to proposed legislative body decisions on behalf of the residents in each respective state, and
    (ii) a representative representing each district who is entitled to provide a representative voting selection pertaining to proposed legislative body decisions on behalf of the residents in each respective district;
  (b) an executive branch to execute the laws of the jurisdiction among other powers and responsibilities, said executive branch comprising a plurality of officers including a President whose powers include:
    (i) the nomination of certain judges,
    (ii) the proposal of legislation, and
    (iii) the veto of legislation accepted by the elected legislative branch, provided that a second senate vote and a second representative vote do not reverse said veto;
  (c) a judicial branch to interpret the laws of the jurisdiction, said judicial branch comprising a plurality of justices and judges; and
  (d) a direct voter branch to ensure that a will of registered users is known and acted upon in a substantially real-time basis, said direct voter branch comprising registered users who have been registered to provide voting selections pertaining to the proposed legislative body decision;
(6) each of a plurality of said registered users may provide a voting selection by selecting a voting option in favor of, or a voting option against the proposed legislative body decision;
(7) said server memory further comprises instructions that, when executed by the server processor cause the processor to perform the steps of:
  (a) determining a number of registered user voting selections in favor of, and a number of registered user voting selections against the proposed legislative body decision; and
  (b) determining acceptance of the proposed legislative body decision by the direct voter branch in dependence upon the number of registered user voting selections in favor of, and the number of registered user voting selections against the proposed legislative body decision.

17. The system defined in claim 16, wherein said jurisdiction is the United States of America.

18. The system defined in claim 11,
(1) said plurality of possible voting options comprise choices concerning a proposed legislative body decision, to be determined by voting selections, and applied to a legal jurisdiction;
(2) a government has been established to govern said legal jurisdiction comprising:
  (a) a direct voting legislative branch whose powers include voting on proposed legislative body decisions to ensure that a will of the registered users is known and acted upon in a substantially real-time basis, said legislative branch comprising registered users who have been registered to provide voting selections pertaining to proposed legislative body decisions on behalf of the residents of the jurisdiction;
  (b) an executive branch which comprises a plurality of officers including a President whose powers include:
    (i) the nomination of certain judges,
    (ii) the proposal of legislative body decisions, and
    (iii) the disapproval of legislative body decisions;
  (c) a judicial branch to interpret the laws of the jurisdiction, said judicial branch comprising a plurality of justices and judges;
(3) each of a plurality of said registered users may provide a registered user voting selection by selecting a voting option in favor of, or a voting option against the proposed legislative body decision;
(4) said server memory further comprises instructions that, when executed by the server processor cause the processor to perform the steps of:
  (a) determining a number of voting selections in favor of, and a number of voting selections against the proposed legislative body decision; and
  (b) determining acceptance of the proposed legislative body decision by the legislative branch in dependence upon the number of registered user voting selections in favor of, and against the proposed legislative body decision.

19. The system defined in claim 18, wherein said jurisdiction is the United States of America.

20. The system defined in claim 11, wherein:
(1) said plurality of possible options comprise choices concerning a proposed legislative body decision, to be determined by voting selections, and applied to a legal jurisdiction;
(2) a plurality of voting districts have been established within the jurisdiction, each district having a plurality of residents residing within the respective district, and each district providing one district vote for the purpose of determining legislative body decisions;
(3) a representative from each district is entitled to provide a voting selection pertaining to proposed legislative body decisions on behalf of residents who do not provide a voting selection in each respective district;
(4) registered users who have been registered within each district may provide a voting selection pertaining to said proposed legislative body decisions;
(5) the server memory further comprises instructions that, when executed by the server processor cause the processor to perform the step of receiving, from at least one legislator terminal, a voting selection of each representative comprising an option in favor of, or an option against the proposed legislative body decision;

(6) registered users in at least one district provide a voting selection by selecting a voting option in favor of, or a voting option against the proposed legislative body decision;

(7) said server memory further comprises instructions that, when executed by the server processor cause the processor to perform the steps of:
  (a) determining a number of registered user voting selections in favor of, and a number of registered user voting selections against the proposed legislative body decision, pertaining to each district;
  (b) determining a district vote pertaining to each district by (i) classifying the district vote as in favor of the option indicated by the respective representative voting selection upon determining that the number of registered users in the district voting differently than the respective representative does not exceed a given number; and (ii) classifying the district vote as opposed to the option indicated by the respective representative voting selection upon determining that the number of registered users in the district voting differently than the respective representative exceeds the given number; and
  (c) determining acceptance of the proposed legislative body decision in dependence upon the number of district votes classified as in favor of and as opposed to the proposed legislative body decision.

21. The system defined in claim 11, wherein:
(1) said plurality of possible options comprise choices concerning a proposed legislative body decision, to be determined by voting selections, and applied to a legal jurisdiction;
(2) a plurality of voting districts have been established within the jurisdiction, each district having a plurality of residents residing within the respective district, and each district providing a total of one district vote for the purpose of determining legislative body decisions;
(3) a representative from each district is designated who is entitled to provide a voting selection pertaining to proposed legislative body decisions on behalf of residents who do not provide a voting selection, in the respective district;
(4) registered users who have been registered within each district may provide a voting selection pertaining to said proposed legislative body decisions;
(5) the server memory further comprises instructions that, when executed by the server processor cause the processor to perform the steps of receiving, from at least one legislator terminal, a voting selection of each of a plurality of said representatives in favor of, or against the proposed legislative body decision;
(6) registered users in a respective district provide votes by selecting a voting option in favor of, or a voting option against the proposed legislative body decision;
(7) said server memory further comprises instructions that, when executed by the server processor cause the processor to perform the steps of:
  (a) determining a number of registered user voting selections in favor of, and a number of registered user voting selections against the proposed legislative body decision, pertaining to each respective district;
  (b) determining a number of oppositional registered user voting selections pertaining to each district as those registered user voting selections which are in opposition to a position represented by the respective representative;
  (c) receiving, from a census computer a number of residents in each district and determining an anti-representative fraction of each district vote as the number of oppositional registered user voting selections pertaining to the respective district divided by the number of residents in the respective district;
  (d) determining a pro-representative fraction of each district vote as a fraction whose numerator is (i) a number of residents in the respective district minus (ii) the number of oppositional registered user voting selections pertaining to the respective district, and whose denominator is the number of residents in the respective district;
  (e) determining a sum of the fractional district vote in favor of the proposed legislative body decision as a sum of (i) the pro-representative fraction of the district vote pertaining to each district in which said district representative provided a voting selection in favor of said proposed legislative body decision and (ii) the anti-representative fraction of the district vote pertaining to each district in which said district representative provided a voting selection against said proposed legislative body decision; and
  (f) determining acceptance of the proposed legislative body decision in dependence upon the sum of each of the fractional district votes in favor of the proposed legislative body decision.

22. The system defined in claim 11, wherein:
(1) said plurality of possible options choices concerning a proposed legislative body decision to be determined by voting selections, and applied to a legal jurisdiction;
(2) a plurality of voting districts have been established within the jurisdiction, each district having a plurality of residents residing within the respective district, and each district providing one district vote for the purpose of determining legislative body decisions;
(3) a representative from each district is entitled to provide a voting selection pertaining to a proposed legislative body decision on behalf of residents who do not provide a voting selection, in the respective district;
(4) registered users who have been registered within each district may provide a voting selection pertaining to said proposed legislative body decision;
(5) the server memory further comprises instructions that, when executed by the server processor cause the processor to perform the step of receiving, from at least one legislator terminal, a voting selection of said providing representative, comprising an option in favor of, or an option against the proposed legislative body decision;
(6) registered users in at least one district provide voting selections by selecting a voting option in favor of, or a voting option against the proposed legislative body decision;
(7) said server memory further comprises instructions that, when executed by the server processor cause the processor to perform the steps of:
  (a) determining a number of registered user voting selections in favor of, and a number of registered user voting selections against the proposed legislative body decision in each district;
  (b) determining, in each district, the district vote:
    (i) by determining a total number of registered user voting selections in favor of the legislative body decision; and upon determining that said total exceeds a first given number for that district, classifying the respective district vote as a district vote in favor of the proposed legislative body decision;

(ii) by determining a total number of registered user voting selections against the legislative body decision; and upon determining that said total exceeds said first given number for that district, classifying the respective district vote as a district vote against the proposed legislative body decision;

(iii) upon determining that each of (I) the total number of registered user voting selections in favor of said decision does not exceed said first given number and (II) the total number of registered user voting selections against said decision does not exceed said first given number and upon receiving, from the legislator terminal, the voting selection of the providing representative, by classifying the respective district vote as the option indicated by the voting selection of the representative;

(iv) upon determining that each of (I) the total number of registered user voting selections in favor of said decision does not exceed said first given number and (II) the total number of registered user voting selections against said decision does not exceed said first given number, and upon determining the absence of a receipt of the voting selection of the respective representative, and that the number of registered user voting selections in favor of said proposed legislative body decision exceeds a second given number for that district, by classifying the respective district vote as a district vote in favor of said proposed legislative body decision; and (v) upon determining that each of (I) the total number of registered user voting selections in favor of said decision does not exceed said first given number and (II) the total number of registered user voting selections against said decision does not exceed said first given number, and upon determining the absence of a receipt of the voting selection of the respective representative and that the number of registered user voting selections against the proposed legislative body decision exceeds a second given number for that district, by classifying the respective district vote as a district vote against the proposed legislative body decision; and (c) determining a sum of the number of said district votes classified as in favor, and said district votes classified as against the proposed legislative body decision, and determining acceptance of the proposed legislative body decision is to be accepted in dependence upon said sums of district votes.

23. The system defined in claim 11, wherein:

(1) said plurality of possible options comprise choices concerning a proposed legislative body decision to be determined by voting selections, and applied to a legal jurisdiction;

(2) a plurality of voting districts have been established within the jurisdiction, each district having a plurality of residents residing within the respective district, and each district providing two district votes for the purpose of determining a proposed legislative body decision;

(3) two representatives from each district are each entitled to provide a voting selection pertaining to proposed legislative body decisions on behalf of residents in each respective district who do not provide a voting selection;

(4) registered users who have been registered within each district may provide a voting selection pertaining to said proposed legislative body decisions;

(5) the server memory further comprises instructions that, when executed by the server processor cause the processor to perform the step of receiving, from at least one legislator terminal, a voting selection of each of a plurality of said representatives, each voting selection comprising an option in favor of, or an option against a proposed legislative body decision;

(6) registered users in at least one district provide voting selections by selecting a voting option in favor of, or a voting option against the proposed legislative body decision;

(7) the server memory further comprises instructions that, when executed by the server processor cause the processor to perform the steps of:

(A) determining a receipt, from said at least one legislator terminal, of identical voting selections from each of the two representatives of a given district;

(a) determining a number of oppositional registered user voting selections pertaining to each district as those registered user voting selections which are in opposition to a voting selection selected by said two representatives in said given district;

(b) receiving, from a census computer, a number of residents in each district and determining an anti-representative fraction of each district vote as the number of respective oppositional registered user divided by the number of residents in the given district;

(c) determining a pro-representative fraction of each district vote as a fraction whose numerator is (i) a number of residents in the respective district minus (ii) the number of oppositional registered user voting selections pertaining to the respective district and whose denominator is the number of residents in the respective district;

(d) equating a fractional district vote in favor of the proposed legislative body decision in each district with (i) the pro-representative fraction of the respective district vote, upon receiving, from said legislator terminal voting selections in favor of said proposed legislative body decision and with (ii) the anti-representative fraction of the respective district vote, upon receiving, from said legislator terminal voting selections against said proposed legislative body decision;

(B) determining a receipt, from said at least one legislator terminal, of opposing voting selections of the two representatives of a given district and thereafter determining the fractional district vote for that district in favor of the proposed legislative body decision as the fraction whose numerator is the number of registered user voting selections pertaining to said district in favor of said proposed legislative body decision, and whose denominator is the total number of residents in said district;

(C) determining a sum of all fractional district votes in favor of said proposed legislative body decision; and (D) selecting a final counting method from the group consisting of (I) a summation of fractional district votes; and (II) a conversion of fractional district votes to integral district votes, followed by the summation of integral district votes;
(E) upon selecting the summation of fractional votes, determining said proposed legislative body decision is to be accepted in dependence upon a sum of the fractional district votes in favor of the proposed legislative body decision; and
(F) upon selecting the conversion of fractional district votes to integral votes:
  (a) pertaining to said respective district:
    (i) determining said integral district vote as two votes in favor of said proposed legislative body decision upon determining that said respective fractional district vote exceeds a first value,
    (ii) determining said integral district vote as one vote in favor of said proposed legislative body decision upon determining that said respective fractional district vote exceeds a second value but does not exceed said first value, and
    (iii) determining said integral district vote as zero votes in favor of said proposed legislative body decision upon determining that said respective fractional district vote does not exceed said second value; and
  (b) determining acceptance of the proposed legislative body decision in dependence upon a sum of the integral district votes in favor of the legislative body decision.

24. The system defined in claim 11, wherein said transaction information further comprises information related to said voting options.

25. The system defined in claim 1, wherein said transaction is a contract, and said transaction choice is a representation of an intent by said user to enter into said contract.

26. The system defined in claim 25, wherein said contract is for the purchase and sale of goods or services.

27. The system defined in claim 1, wherein said transaction entails an exchange of information, and wherein said information is selected from the group:
  medical information,
  legal information,
  political information, and
  financial information.

28. A method for exchanging information between a server and a terminal of a potential user for securely executing a transaction comprising:
  (a) receiving, by the server, identification information of a registered user, from a terminal of the registered user, wherein said identification information comprises biological information including at least one of a finger, face, or iris print and alphanumeric information pertaining to a person allowed to execute the transaction;
  (b) receiving, by the server, transaction information, from a transaction content computer wherein the transaction information comprises a plurality of options;
  (c) transmitting, by a terminal of a potential user, a request for the transaction information to the server;
  (d) receiving, by the server, the request;
  (e) transmitting, by the server, the transaction information to the terminal of a potential user;
  (f) displaying, by the terminal of a potential user, the transmitted transaction information including the plurality of options;
  (g) detecting, by the terminal of a potential user, a selection by a potential user of at least one of the plurality of options;
  (h) based on the detecting of the selection, activating, by the terminal of a potential user, a digital camera;
  (i) capturing, by the digital camera, a biological image of the potential user and the selection of the at least one of the plurality of options by the potential user wherein the biological image comprises at least one of: finger, face, or iris print;
  (j) creating, by the terminal of a potential user, a digital file comprising the captured biological image and the selection of the at least one of the plurality of options by the potential user;
  (k) transmitting, by the terminal of a potential user, alphanumeric information of the potential user and the digital file to the server;
  (l) retrieving, by the server, the identification information using the alphanumeric information of the potential user; comparing the biological image of the digital file with the corresponding biological information from the retrieved identification information; and determining a match between the biological image and the corresponding biological information from the identification information; and
  (m) based on the match, retrieving, by the server, the selection of the at least one of the plurality of options from the digital file and executing a transaction represented by the selection.

29. The method of claim 28, wherein said step (f) includes displaying information representing said plurality of options on a display screen.

30. The method of claim 28, wherein:
  capturing by the digital camera further comprises capturing a plurality of images, each including the biological image of the potential user and the selection of the at least one of the plurality of options by the potential user;
  the created and transmitted digital file further comprises said plurality of images;
  comparing further comprises comparing at least one of the biological images of the digital file with the retrieved biological information.

31. The method of claim 28, wherein said biological information pertaining to a person allowed to execute the transaction, and biologic information of the potential user further comprise information pertaining to a second biologic feature selected from the group comprising:
  (1) an image of a fingerprint,
  (2) an image of a palm,
  (3) an image of a retina,
  (4) an image of an iris, and
  (5) an image of a face.

32. The method of claim 28, wherein said biological image further comprises intermediate body parts of said potential user, said intermediate body parts extending between a potential user body part inputting said selection and a potential user body part which is a source of said at least one of: finger, face or iris print;
  whereby said biological image including said intermediate body parts serves to prove that said inputting body part and said source body part belong to the same potential user.

33. The method of claim 28, wherein said transaction is a contract, and said transaction selection is a representation of an intent by said user to enter into said contract.

34. The method of claim 33, wherein said contract is for the purchase and sale of goods or services.

35. The method of claim 28, wherein said transaction entails an exchange of information, and wherein said information is selected from the group:
- medical information,
- legal information,
- political information, and
- financial information.

36. The method of claim 28, wherein:
(A) said transaction is a vote;
(B) said transaction selection is a selection from among a plurality of voting options; and
(C) executing a transaction represented by the selection includes determining, by the server, a sum of received selections corresponding to each voting option, each summed selection by one of a plurality of registered voting persons.

* * * * *